(12) United States Patent
Miyajima et al.

(10) Patent No.: US 9,170,711 B2
(45) Date of Patent: Oct. 27, 2015

(54) AUDIO PROCESSING DEVICE, AUDIO PROCESSING METHOD, AND PROGRAM

(71) Applicant: SONY CORPORATION, Tokyo (JP)

(72) Inventors: Yasushi Miyajima, Kanagawa (JP); Atsushi Hashizume, Tokyo (JP); Ryo Mukaiyama, Tokyo (JP)

(73) Assignee: Sony Corporation, Tokyo (JP)

( * ) Notice: Subject to any disclaimer, the term of this patent is extended or adjusted under 35 U.S.C. 154(b) by 194 days.

(21) Appl. No.: 13/940,464

(22) Filed: Jul. 12, 2013

(65) Prior Publication Data
US 2014/0068435 A1    Mar. 6, 2014

(30) Foreign Application Priority Data

Sep. 6, 2012 (JP) .................................. 2012-195766

(51) Int. Cl.
*G06F 3/0482* (2013.01)
*G11B 27/10* (2006.01)
*G11B 27/34* (2006.01)

(52) U.S. Cl.
CPC .............. *G06F 3/0482* (2013.01); *G11B 27/10* (2013.01); *G11B 27/34* (2013.01)

(58) Field of Classification Search
None
See application file for complete search history.

(56) References Cited

U.S. PATENT DOCUMENTS

| 5,353,275 | A | * | 10/1994 | Almonte | 369/189 |
| 5,824,933 | A | * | 10/1998 | Gabriel | 84/609 |
| 7,902,446 | B2 | * | 3/2011 | Humphrey | 84/470 R |
| 2008/0013757 | A1 | * | 1/2008 | Carrier | 381/119 |
| 2010/0204811 | A1 | * | 8/2010 | Transeau | 700/94 |
| 2013/0123961 | A1 | * | 5/2013 | Roman et al. | 700/94 |

FOREIGN PATENT DOCUMENTS

| JP | 2008-164932 | 7/2008 |
| WO | WO2007/066919 | 6/2007 |

OTHER PUBLICATIONS

ApkMania, Retro Tape Deck Music Player v2.0.2 apk, Nov. 19, 2011, Blogspot.com, http://apkmanea.blogspot.com/2011/11/retro-tape-deck-music-player-v202-apk.html.*

* cited by examiner

*Primary Examiner* — William Bashore
*Assistant Examiner* — Daniel Parcher
(74) *Attorney, Agent, or Firm* — Paratus Law Group, PLLC

(57) ABSTRACT

An audio processing device includes: a display control unit, configured to control display of a plurality of audio gears, which are gears movable within a screen, each audio gear corresponding to predetermined audio data; and a playback control unit configured to control synchronized playback of a plurality of audio data; wherein, in the event that a plurality of the audio gears are directly or indirectly meshed, the display control unit rotates the plurality of audio gears, and the playback control unit performs synchronized playback of the plurality of audio data corresponding to the plurality of audio gears.

15 Claims, 32 Drawing Sheets

FIG. 7
TONIC = C  C  F  G  Am 
 FOUR SEMITONES
TONIC = E  E  A  B  C#m 
I  IV  V  VIm

FIG. 8

| BAR/BEAT NO. | THE VALUE INDICATING BEAT m IN BAR n IS SET. |
|---|---|
| ATTRIBUTE | TYPES OF ATTRIBUTES SUCH AS BEAT INFORMATION, MELODY INFORMATION, CHORD INFORMATION ARE SET WITH DETAILED DATA OF THE ATTRIBUTES. |
| SAMPLE POSITION | THE SAMPLE POSITION OF THE TUNE DATA IS SET. |

FIG. 9

| BAR/BEAT | ATTRIBUTE | SAMPLE POSITION |
|---|---|---|
| 11 | 01800001 | 23190 |
| 12 | 01000001 | 65280 |
| 13 | 01000001 | 83200 |
| 14 | 01000001 | 100416 |
| 21 | 01800001 | 118400 |
| 22 | 01000001 | 136192 |

FIG. 23

|  | I | II | III | IV | V | VI | VII |
|---|---|---|---|---|---|---|---|
| 1 | 10 |  |  |  |  |  |  |
| 2 | 10 |  |  |  |  |  |  |
| 3 |  | 10 |  |  |  |  |  |
| 4 |  |  | 10 |  |  |  |  |
| 5 | 5 | 5 | 5 |  |  |  |  |
| 6 |  | 5 | 5 | 5 |  |  |  |
| 7 |  |  |  | 5 | 10 |  |  |
| 8 |  |  |  | 10 |  |  |  |
| 9 |  |  |  |  |  | 10 |  |
| 10 | 5 |  | 5 | 5 |  | 10 |  |
| 11 |  | 5 |  |  | 5 |  |  |
| 12 |  |  |  |  |  | 10 | 10 |

*BLANKS INDICATE 0

FIG. 24

| | I | | II | III | IV | | | V | VI | | VII | |
|---|---|---|---|---|---|---|---|---|---|---|---|---|
| | 1 | 2 | 3 | 4 | 5 | 6 | 7 | 8 | 9 | 10 | 11 | 12 |
| I | 10 | 10 | | | | | | | | | | |
| II | | | 10 | 5 | 5 | 5 | | | | | | 5 |
| III | 5 | 5 | | 10 | 10 | 5 | 5 | | 5 | | | |
| IV | 5 | | 5 | | | 10 | | 10 | 5 | 5 | | |
| V | | | | | | | 10 | | | | | |
| VI | 5 | 5 | 5 | 5 | | | | | 10 | 10 | 10 | |
| VII | | | | 5 | 5 | | | 5 | | | 10 | 10 |

*BLANKS INDICATE 0

FIG. 25

|   | C 1 | C# 2 | D 3 | D# 4 | E 5 | F 6 | F# 7 | G 8 | G# 9 | A 10 | A# 11 | B 12 |
|---|---|---|---|---|---|---|---|---|---|---|---|---|
| C 1 | 10 |   |   |   |   |   |   |   |   |   |   |   |
| 2 |   | 10 |   |   |   |   |   |   |   |   |   |   |
| D 3 |   |   | 10 |   |   |   |   |   |   |   |   |   |
| 4 |   |   |   | 10 |   |   |   |   |   |   |   |   |
| E 5 |   |   |   |   | 10 |   |   |   |   |   |   |   |
| F 6 |   |   |   |   |   | 10 |   |   |   |   |   |   |
| 7 |   |   |   |   |   |   | 10 |   |   |   |   |   |
| G 8 |   |   |   |   |   |   |   | 10 |   |   |   |   |
| 9 |   |   |   |   |   |   |   |   | 10 |   |   |   |
| A 10 |   |   |   |   |   |   |   |   |   | 10 |   |   |
| 11 |   |   |   |   |   |   |   |   |   |   | 10 |   |
| B 12 |   |   |   |   |   |   |   |   |   |   |   | 10 |

*BLANKS INDICATE 0

AUDIO PROCESSING DEVICE, AUDIO PROCESSING METHOD, AND PROGRAM

BACKGROUND

The present technology relates to an audio processing device, an audio processing method, and a program, and more particularly relates to an audio processing device, an audio processing method, and a program, whereby disc jockey (DJ) play can be performed with simple operations.

As of recent, there is being sold software which enables users to perform remix playback, such as playing multiple tunes in a synchronized manner, or connecting multiple tunes and playing in a non-stop manner (non-stop mix playback), by simulating equipment which DJs use, such as turntables and the like.

However, this software simply simulates equipment that DJs use, so a certain level of techniques and musical knowledge is assumed for use. For example, playing one tune and starting the next tune before ending the first tune, the user has to match the tempo and beat position of the tune being started with the tune already playing, and then gradually switch the tunes by balancing the volume of the two. Also, where the two tunes transition, both tunes are played at once, so the user has to find a combination of tunes where the sound of the two tunes does not create a discordant impression.

On the other hand, there have been proposed techniques to easily match the tempo and beat position of multiple tunes for this sort of playing, according to the related art. Examples of the related art include International Publication No. 2007/066919 and Japanese Unexamined Patent Application Publication No. 2008-164932.

SUMMARY

However, neither of these Publications give particular consideration to enable DJ play with simple operations.

There has been found demand to enable DJ play with simple operations.

According to an embodiment, an audio processing device includes: a display control unit, configured to control display of a plurality of audio gears, which are gears movable within a screen, each audio gear corresponding to predetermined audio data; and a playback control unit configured to control synchronized playback of a plurality of audio data; wherein, in the event that a plurality of the audio gears are directly or indirectly meshed, the display control unit rotates the plurality of audio gears, and the playback control unit performs synchronized playback of the plurality of audio data corresponding to the plurality of audio gears.

The display control unit may further control display of a power gear which is a gear corresponding to no audio data; with, in the event that a plurality of the audio gears are meshed with the power gear, the display control unit rotating the plurality of the audio gears along with the power gear, and the playback control unit performing synchronized playback of the plurality of audio data corresponding to the plurality of audio gears indirectly meshed via the power gear.

A tempo at which audio data is played may be variable, with the display control unit changing the rotational speed of the power gear and the rotational speed of the audio gears meshed with the power gear, in accordance with a set tempo.

Each cog of the power gear and the audio gears may represent one beat, with the display control unit rotating, during the progression of one beat of audio data, the power gear and the audio gears meshed with the power gear by one pitch worth.

The display control unit may further control display of a predetermined plurality of placement positions to mesh the audio gears to the power gear, with the playback control unit playing audio data corresponding to the audio gears placed at the placement positions.

The audio processing device may further include an audio data searching unit configured to search for second audio data suitable for playing connected to first audio data which is currently playing, with the display control unit displaying the multiple placement positions each with different forms, and also displaying the audio gear corresponding to the second audio data with a form corresponding to a display form of the placement position for playing connected to the first audio data.

In the event that a second audio gear corresponding to the second audio data is meshed with the power gear in a situation where the first audio data is being played by a first audio gear having been meshed with the power gear, the playback control unit may fade out the first audio data, with the display control unit relocating the first audio gear from a position meshed with the power gear in conjunction with the fadeout of the first audio data.

A tempo at which audio data is played may be variable, with the display control unit changing the rotational speed of the audio gears in accordance with a set tempo.

Each cog of the audio gears may represent one beat, with the display control unit rotating the audio gears by one pitch worth during the progression of one beat of audio data.

The audio processing device may further include an audio data searching unit configured to search for audio data suitable for playing connected to audio data which is currently playing, with the display control unit displaying the audio gear corresponding to the searched audio data with a form different from that of the other audio gears.

The playback control unit may play with the start of bars of the plurality of audio data matched.

The display control unit may display audio gears corresponding to tunes or parts of tunes, and audio gears corresponding to loop material, with different forms.

The audio processing device may further include an operating unit configured to operate the audio gears.

According to an embodiment, an audio processing method includes: controlling display of a plurality of audio gears, which are gears movable within a screen, each audio gear corresponding to predetermined audio data; and in the event that a plurality of the audio gears are directly or indirectly meshed, controlling display so as to rotate the plurality of audio gears, and performing synchronized playback of the plurality of audio data corresponding to the plurality of audio gears.

According to an embodiment, a program causes a computer to perform processing including: controlling display of a plurality of audio gears, which are gears movable within a screen, each audio gear corresponding to predetermined audio data; and in the event that a plurality of the audio gears are directly or indirectly meshed, controlling display so as to rotate the plurality of audio gears, and performing synchronized playback of the plurality of audio data corresponding to the plurality of audio gears.

According to the above configurations, a plurality of audio gears which are gears movable within a screen, are displayed, each audio gear corresponding to predetermined audio data; and in the event that a plurality of the audio gears are directly or indirectly meshed, the plurality of audio gears are rotated, synchronized playback is performed of the plurality of audio data corresponding to the plurality of audio gears. Thus, DJ play can be performed with simple operations.

BRIEF DESCRIPTION OF THE DRAWINGS

FIG. 7 is a diagram for describing relative key and absolute key;

FIG. 8 is a diagram illustrating an example of data configuration of metadata.

FIG. 9 is a diagram illustrating a specific example of metadata;

FIG. 23 is a diagram illustrating an example of a similarity matrix for a major key;

FIG. 24 is a diagram illustrating an example of a similarity matrix for a minor key;

FIG. 25 is a diagram illustrating an example of a similarity matrix for a case where scales are different;

DETAILED DESCRIPTION OF EMBODIMENTS

The following is a description of embodiments to carry out the present technology (hereinafter, referred to as "embodiments"). Note that description will proceed in the following order.

1. Embodiment
2. Modification

1. Embodiment

Configuration Example of Music Remix System 101

Figure 1:
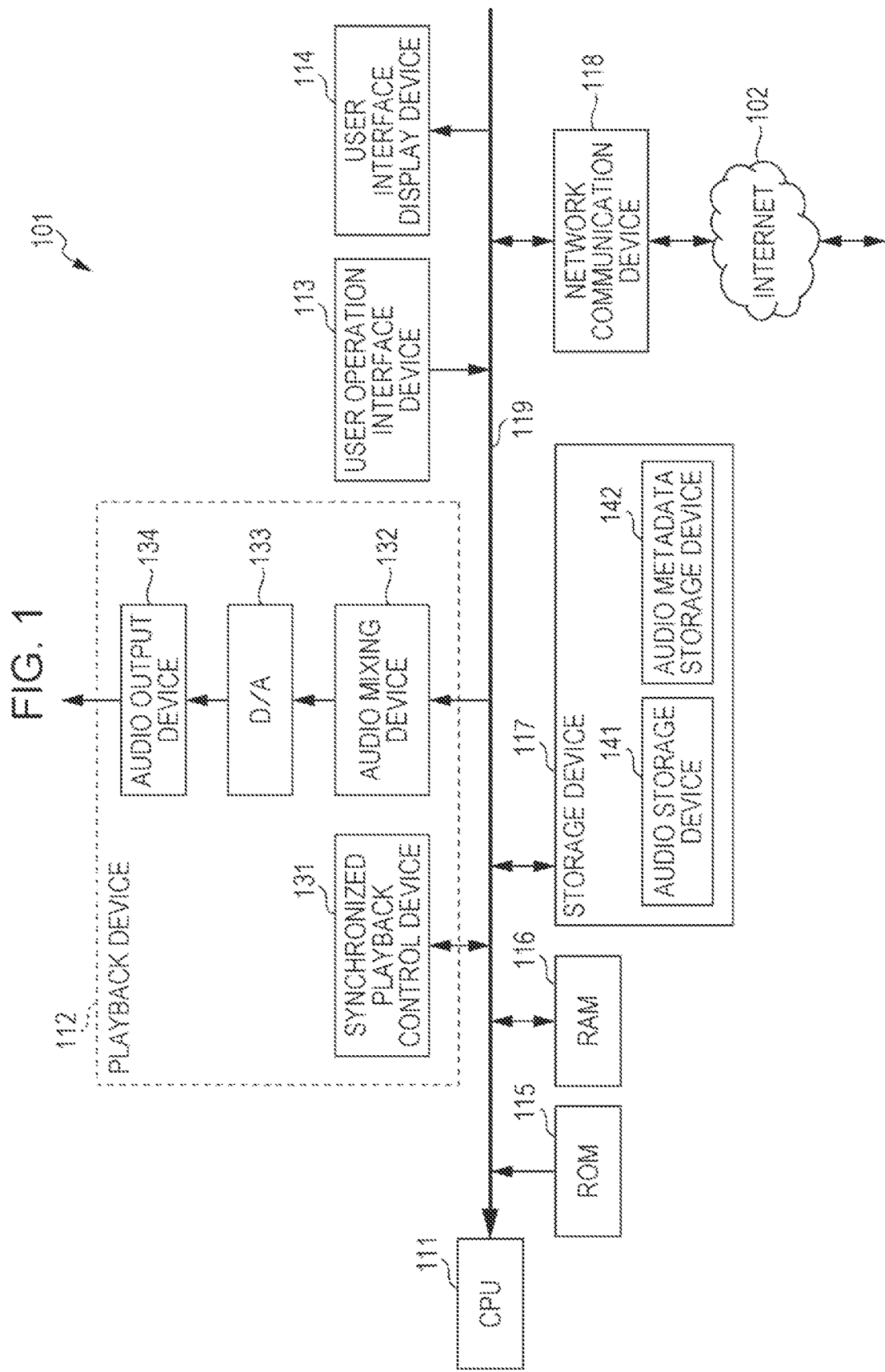
FIG. 1 is a block diagram illustrating a first embodiment of a music remix system to which the present technology has been applied.

FIG. 1 is a block diagram illustrating an embodiment of a music remix system 101 to which the present technology has been applied.

The music remix system 101 is a device to remix playback and DJ play audio materials or multiple audio materials from a portion of audio data. According to the music remix system 101, for example, sophisticated and complicated DJ play such as synchronized playback of multiple audio materials, or nonstop mix playback where multiple audio materials are played seamlessly, can be performed easily.

Here, "synchronized playback of multiple audio materials" means to playback multiple sound sources at the same tempo and with the timing of the beat position synced. Also, there are cases where playback with the timing of the start of each bar is synced, not just the beat position.

Furthermore, "mix playback of multiple audio materials" is to playback multiple audio materials regardless of whether synchronizing has been performed or not.

The types of audio materials used in music remix system 101 are not restricted in particular. The types of audio materials, for example, can be generally divided into tunes (including portions of tunes) and loop material.

A "portion of a tune" is a partial extraction of a complete tune. A portion of a tune includes, for example, not only audio data of a portion of a complete tune, but also audio data of a track extracted from the multiple tracks making up the tune (such as vocal tracks etc.).

Moreover, a "loop material" is a material that is a recorded or artificially generated cyclical rhythmic sounds like drum patterns, short musical phrases, human voice, animal calls, sound effects, or the like. These sounds are mainly repetitively played with other tunes. Note that hereinafter, the tune and loop material may be collectively referred to as "audio data".

Remix playback in the music remix system 101 is performed by placing audio tracks on the remix line, which is configured of multiple tracks, and then playing each track on the same temporal axis, and combining them together.

Figure 2:
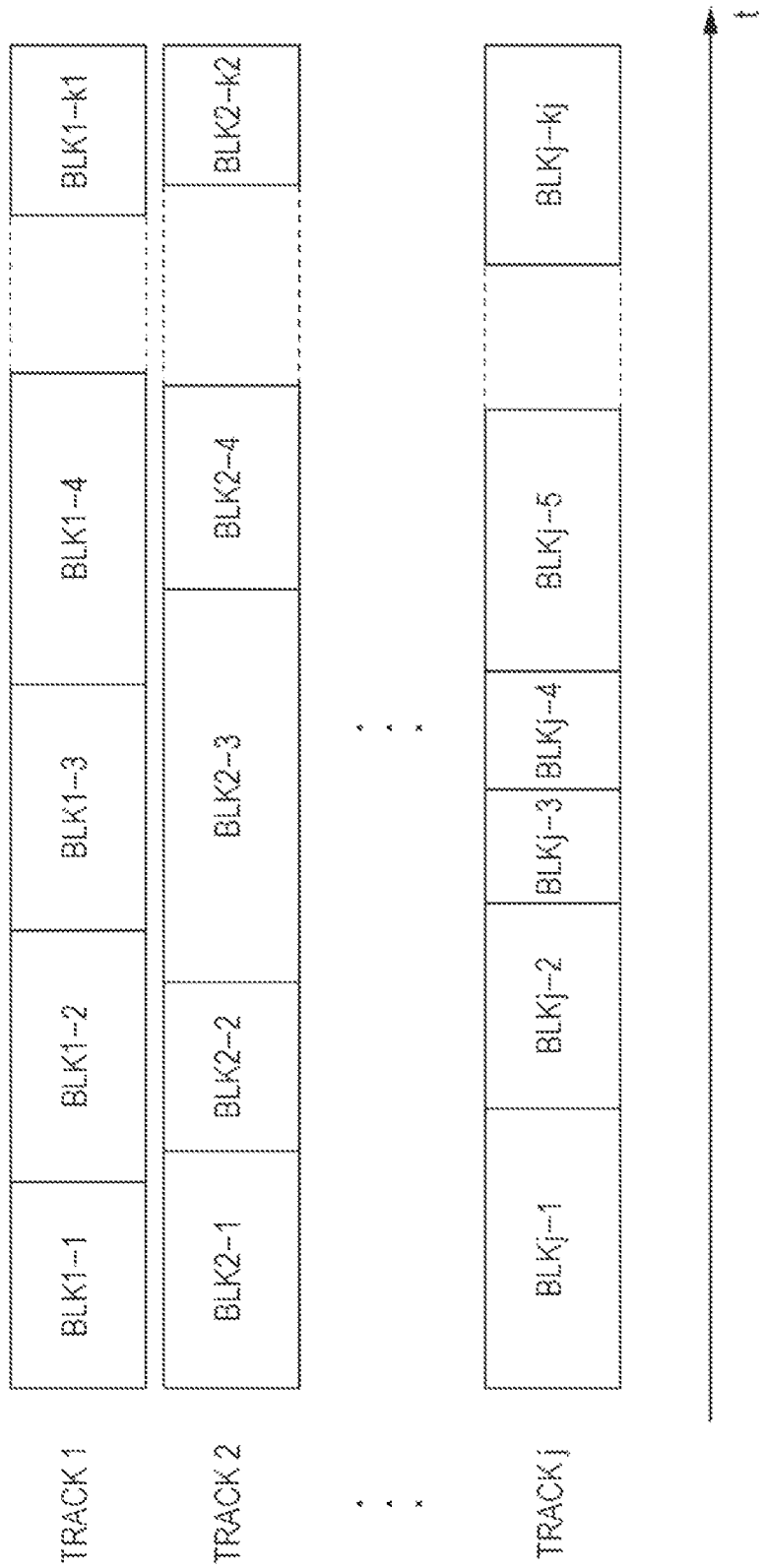
FIG. 2 is a diagram illustrating an example of a remix line.

FIG. 2 illustrates an example of the remix line constructed by j tracks, which are track 1 through track j. In FIG. 2, the horizontal represents the temporal axis, i.e., the temporal axis when remix playback is being performed. Audio materials placed on the same track are played in order from the left, and multiple audio materials placed in the same temporal axis direction, position, and on different tracks, are played at the same time.

Note that hereinafter, audio materials placed in each track of the remix line will also be referred to as "audio blocks" in particular. In the case of FIG. 2, blocks BLK1-1 through BLKj-kj are audio blocks.

Figure 3:
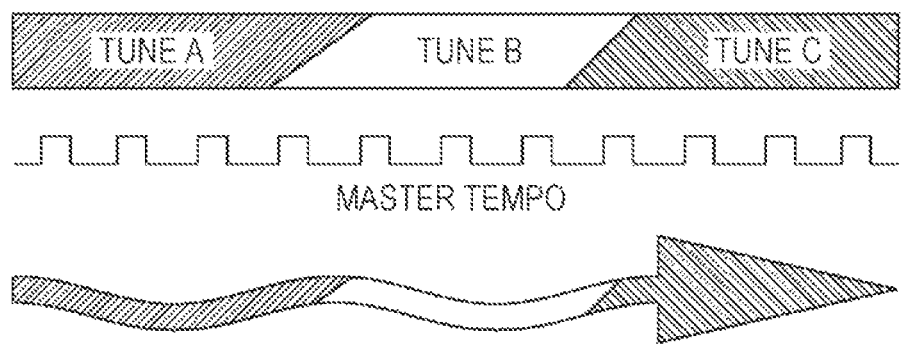
FIG. 3 is a diagram for describing a time stretch.

Also, in the event that music remix system 101 performs remix playback, as shown in FIG. 3, adjustment of playback speed, in other words, time stretch, is performed so as to match the tempo of audio materials with different tempos, extracted from playback tune A through tune C, as to tempo on the temporal axis of the remix line (hereinafter referred to as "master tempo").

Returning to FIG. 1, the music remix system 101 is configured of a central processing unit (CPU) 111, a playback device 112, an user operating interface device 113, an user interface display device 114, read only memory (ROM) 115, random access memory (RAM) 116, a storage device 117, and a network communication device 118. The CPU 111, playback device 112, user operation interface device 113, user interface display device 114, ROM 115, RAM 116, storage device 117, and network communication device 118 are mutually connected via the bus 119.

The CPU 111 controls processing in the music remix system 101 based on users instructions input via the user operation interface device 113.

The playback device 112 performs a playback processing of audio data stored in an audio storage device 141 under the control of CPU 111. The playback device 112 includes a synchronized playback control device 131, an audio mixing device 132, a digital/analog conversion device (D/A) 133, and an audio output device 134.

The synchronized playback control device 131 plays audio data stored in the audio storage device 141 according to each track of the remix line, and provides audio signals from multiple systems (tracks) to the audio mixing device 132, under the control of CPU 111. Also, the synchronized playback control device 131 provides information indicating the playback position on the audio data on the temporal axis of the remix line to the CPU 111.

The audio mixing device 132 combines multiple systems of audio signals from the synchronized playback control device 131 under the control of the CPU 111, and provides this to the audio output device 134.

The D/A 133 converts the digital audio signals supplied from the audio mixing device 132 into analog audio signals, and provides the analog audio signals to the audio output device 134.

The audio output device 134 amplifies the analog audio signals from the D/A 133, and outputs to output devices such as speakers or headphones.

The user operation interface device 113, is, for example, configured a touch panel, keys, buttons, mouse, keyboard, and so forth, accepts instructions from the user to perform processing, and provides information indicating the instruction to each unit of the music remix system 101.

The user interface display device 114, is, for example, configured of a display device such as a liquid crystal display (LCD), a light emitting diode (LED) or the like. The user interface display device 114 displays the operation state, processing state, and so forth, of the music remix system 101, such as a DJ play screen to perform DJ play operations, under the control of the CPU 111.

Note that for example, the user operating interface device 113 and the user interface display device 114 may be integrated by configuring the user operating interface device 113 by a touch panel and installing on the user interface display device 114.

The ROM 115 stores data such as control programs or a wide variety of data, executed by the CPU 111.

The RAM 116 is used as a work area of the CPU 111 and so forth.

The storage device 117 is configured of the audio storage device 141 and an audio metadata storage device 142.

The audio storage device 141, is, for example, configured of storage devices or record devices such as flash memory, or a hard disk, and various types of audio data are stored. For example, audio data is converted into digital audio data that is sampled by the pulse code modulation (PCM) format at a predetermined sampling frequency, and stored in a compressed state according to a predetermined format as appropriate.

The audio metadata storage device 142, is, for example, configured of storage devices or recording devices such as flash memory, hard disk, or the like, and various types of metadata of audio data are stored. Note that metadata will be described later in detail, with reference to FIGS. 6 through 9.

Note that audio data and metadata corresponding to the same audio are correlated with each other, using an audio ID or the like identifying each audio uniquely. Alternatively, in a case of the audio data being in a format such as MPEG Audio Layer-3 (MP3), fringe data (metadata) may be stored in the same file as an ID3 tag.

In addition, the audio storage device 141 and the audio metadata storage device 142 may be configured are separate storing devices, or may be configured as a single storage device.

The network communication device 118 receives and transmits various types of information via networks such as the Internet 102. For example, the network communication device 118 can download audio data and metadata from servers or systems owned by another user that is connected to the Internet 102, or transmit various types of information and data to the server and other systems.

Detailed Example of Embodiment of the Playback Device 112

Figure 4:
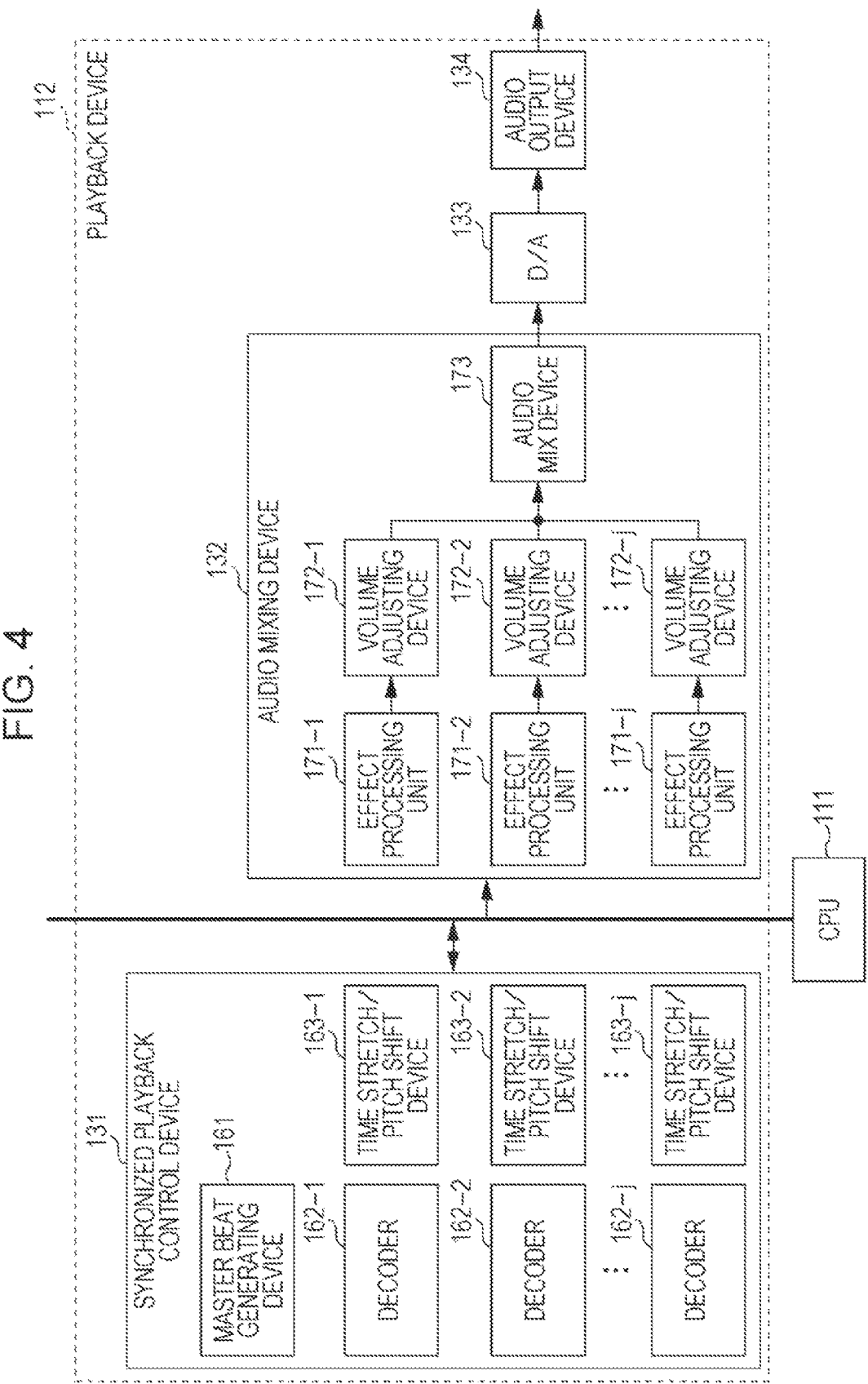
FIG. 4 is a diagram illustrating a detailed configuration of a playback device.

FIG. 4 is a block diagram illustrating an example of a detailed embodiment of the synchronized playback control device 131 and the audio mixing device 132 in the playback device 112.

The synchronized playback control device 131 is configured of a master beat generating device 161, a decoder 162-1 through 162-j, and a time stretch device/pitch shift devices 163-1 through 163-j. Moreover, the audio mixing device 132 is configured of effect processing units 171-1 through 171-j, volume adjusting devices 172-1 through 172-j, and an audio mix device 173.

Each of the decoders 162-1 through 162-j, the time stretch device/pitch shift devices 163-1 through 163-j, the effect processing units 171-1 through 171-j and the volume adjusting devices 172-1 through 172-j form groups, and each performs processing on one of the tracks. For example, decoder 162-1, time stretch device/pitch shift device 163-1, effect processing unit 171-1, and volume adjusting device 172-1 form one group, and perform processing corresponding to a track. Therefore, the playback device 112 in FIG. 2 is of a configuration capable of playing j systems (tracks) of audio data (audio material) at the same time, and combining these.

Note that hereinafter, when decoders 162-1 through 162-j do not have to be individually distinguished, these will simply be referred to as "decoder 162". When time stretch device/ pitch shift devices 163-1 through 163-j do not have to be individually distinguished, these will simply be referred to as "time stretch device/pitch shift device 163". When effect processing units 171-1 through 171-j do not have to be individually distinguished, these will simply be referred to as "effect processing unit 171". When volume adjusting devices 172-1 through 172-j does not have to be individually distinguished, these will simply be referred to as "volume adjusting device 172".

The master beat generating device 161 generates a master beat, which is a clock signal based on the master tempo set by the user, and provides this to each unit of the playback device 112 and the user interface display device 114. Also, the master beat generating device 161 generates a bar signal which is a clock signal in accordance with the timing of the start of a bar in the remix line, based on the measure in the remix line which has been set by the user or the like, and provides this to each unit of the playback device 112 and the user interface display device 114. For example, in the event that the measure in the remix line is set to quadruple time, the master beat generating device 161 outputs a bar signal every time four clocks (four beats) of the master beat are output. Also, the master beat generating device 161 supplies the CPU 111 with information indicating the playback position of the current remix line, in terms of what beat of what bar.

The decoder 162 and time stretch device/pitch shift device 163 are paired, and configure an audio signal generating unit. Each audio signal generating unit performs playback of audio data stored in the audio storage device 141, at timing of the position of the bar and beat of the temporal axis on the mix line, indicated by the master beat and bar signal, under the control of the CPU 111.

Decoders 162-1 through 162-*j* individually obtain audio data from audio storage device 141 and decode audio data compressed in a predetermined format such as MP3 or Adaptive Transform Acoustic Coding (ATRAC) using the metadata for each tune, under control of the CPU 111. Decoders 162-1 through 162-*j* then provide the PCM format audio signal results obtained by the decoding, to the time stretch device/pitch shift devices 163-1 through 163-*j*.

The time stretch device/pitch shift devices 163-1 through 163-*j* perform time stretch and pitch shift processing individually as to audio signals from decoders 162-1 through 162-*j*, and provide to the effect processing units 171-1 through 171-*j* after changing the audio signals playback speed and pitch, under the control of CPU 111.

The effect processing units 171-1 through 171-*j* individually perform effect processing on the audio signals from the time stretch device/pitch shift devices 163-1 through 163-*j*, such as low pass filter, high pass filter, band pass filter, vocal canceler, reverb, delay, distortion, and maximizer, then provides this to the volume adjusting devices 172-1 through 172-*j*, under control of the CPU 111.

The volume adjusting devices 172-1 through 172-*j* individually adjusts the volume of the audio signals from each unit of the effect processing units 171-1 through 171-*j*, then provides this to the audio mix device 173, under control of the CPU 111.

The audio mix device 173 combines audio signals from volume adjusting devices 172-1 through 172-*j*, then provides this to the D/A 133.

Moreover, some functions, or every function in the playback device 112, may be realized by software.

Functional Configuration Example of Music Remix System 101

Figure 5:
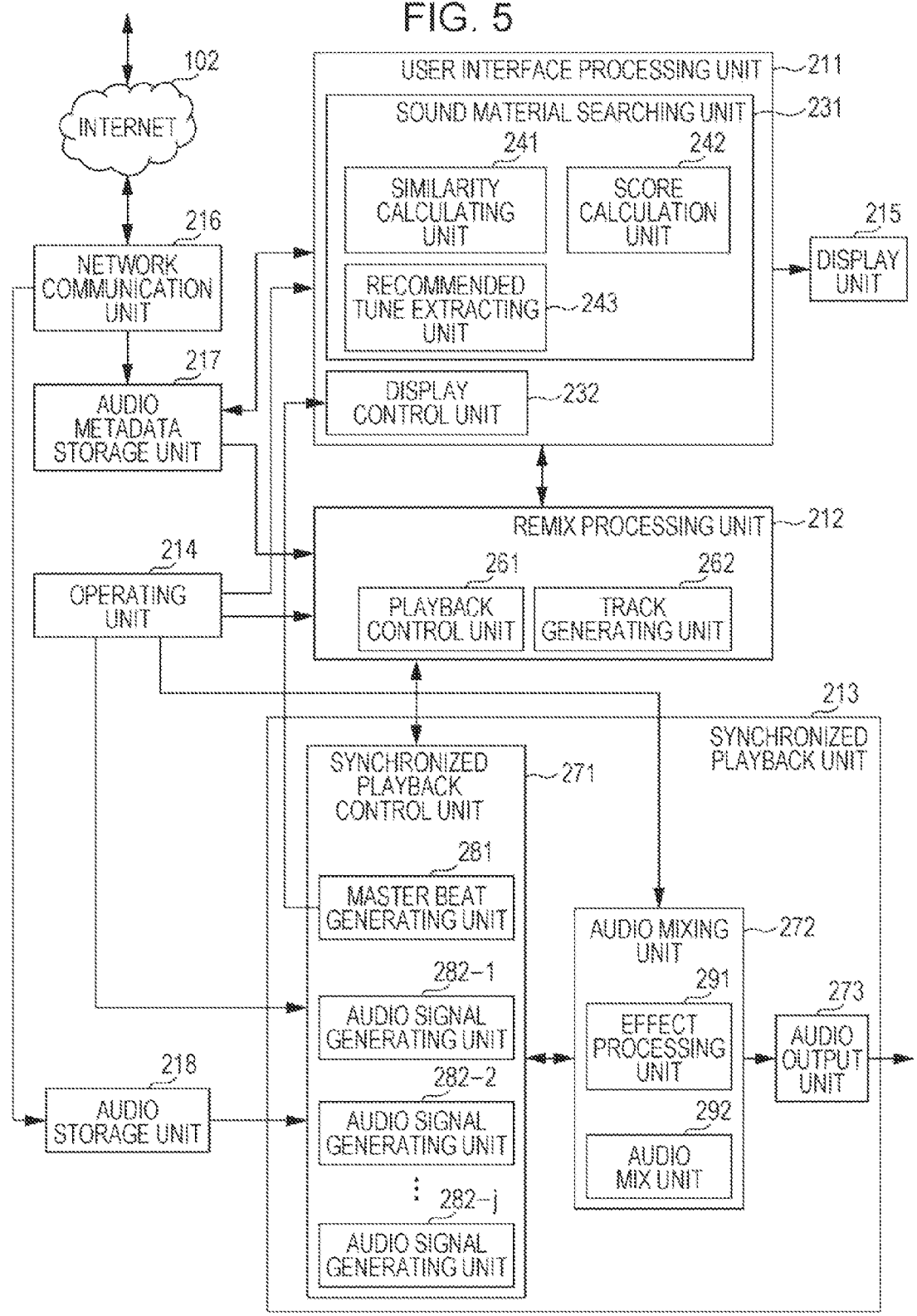
FIG. 5 is a block diagram illustrating a functional configuration of a music remix system.

FIG. 5 is a block diagram illustrating a functional configuration example of the music remix system 101. From a functional perspective, the music remix system 101 is configured with the user interface processing unit 211, the remix processing unit 212, synchronized playback unit 213, the operating unit 214, the display unit 215, the network communication unit 216, the audio metadata storage unit 217, and the audio storage unit 218.

The user interface processing unit 211 is realized by the CPU 111 executing a predetermined control program, and executes processes related to the user interface of the music remix system 101. The user interface processing unit 211 is configured of the audio material searching unit 231 and the display control unit 232.

The audio material searching unit 231 searches audio materials suitable for merging or consecutively playing with the target audio material. The audio material searching unit 231 is configured of the similarity calculating unit 241, the score calculation unit 242, and the recommended tune extracting unit 243.

The similarity calculating unit 241 calculates the similarity of the chord progression of the two audio materials based on the metadata of each tune, and provides information of the score indicating the calculated similarity to score calculation unit 242.

The score calculation unit 242 searches audio materials suitable for merging or consecutively playing with the target audio material, based on the similarity calculated by the similarity calculating unit 241. The score calculation unit 242 then calculates the score indicating how much the searched audio material fits the target audio material. The score calculation unit 242 stores the searched audio material, and the information indicating the score into the audio metadata storage unit 217.

The recommended tune extracting unit 243 extracts tunes suited for playing consecutively after the tune presently being played as a recommended tune, based on the score stored in the audio metadata storage unit 217. The recommended tune extracting unit 243 provides the extraction results of the recommended tune to the display control unit 232.

The display control unit 232 controls the display of the DJ play screen or the like by the display unit 215. Also, the display control unit 232 syncs each part of the display of the DJ play screen with playback of audio data, based on the master beat provided from the master beat generating unit 281.

The remix processing unit 212 is realized by the CPU 111 executing a predetermined control program, and executes processing related to remix playback. The remix processing unit 212 is configured of the playback control unit 261 and the track generating unit 262.

The playback control unit 261 provides audio data and metadata to audio signal generating units 282-1 through 282-*j*, and controls the playback position and playback timing of the audio data of from the extraction source of each audio material by the audio signal generating units 282-1 through 282-*j*. Also, the playback control unit 261 controls the playback speed of the audio materials by the audio signal generating units 282-1 through 282-*j*, where the audio materials are played at timing of the master tempo, based on the original tempo which is the tempo of the audio data of each audio materials extraction source.

Furthermore, the playback control unit 261 controls the effect processing unit 291 to adjust the volume of the audio signal output by the effect processing unit 291. Moreover, the playback control unit 261 controls the pitch of the playback sound of the audio material by the audio signal generating units 282-1 through 282-*j*, so that the key of the audio material matches the timing of the master key, based on the difference between the original key (which is the audio data of the extraction source of each audio material) and the master key, and the amount of control of the playback speed by the playback control unit 261, as appropriate.

The track generating unit 262 generates the audio signal generating unit 282 to the number of the tracks used in remix playback. Specifically for example, the track generating unit 262 starts the processing of the decoders 162 and time stretch device/pitch shift device 163, to the number of the tracks used in remix playback.

The synchronized playback unit 213 is realized by the playback device 112 in FIG. 4, and configures the synchronized playback control unit 271, the audio mixing unit 272, and the audio output unit 273. The synchronized playback control unit 271 is realized by the synchronized playback control device 131 in FIG. 4, configures the master beat generating unit 281 and the audio signal generating units 282-1 through 282-j. The master beat generating unit 281 is realized by the master beat generating device 161 in FIG. 4 and the audio signal generating units 282-1 through 282-j are each realized by the decoders 162-1 through 162-j and time stretch device/pitch shift devices 163-1 through 163-j in FIG. 4.

The audio mixing unit 272 is realized by the audio mixing device 132 in FIG. 4, and configures the effect processing unit 291 and the audio mix unit 292. The effect processing unit 291 is realized by the effect processing untie 171-1 through 171-j and the volume adjusting devices 172-1 through 172-j in FIG. 4, and the audio mix unit 292 is realized by the audio mix device 173 in FIG. 4. The audio output unit 273 is realized by the D/A 133 and audio output device 134 in FIG. 4.

The operating unit 214, the display unit 215, the network communication unit 216, the audio metadata storage unit 217, and the audio storage unit 218 are each realized by the user operation interface device 113, the user interface display device 114, the network communication device 118, the audio storage device 141, and the audio metadata storage device 142 in FIG. 1.

Note that hereinafter, when describing processing of the music remix system 101, description will be made based on the block diagram in FIG. 5.

Details of Metadata of Audio Data

Next, details of the metadata will be described with reference to FIGS. 6 through 9. The metadata is a data indicating the aspect of the tune, and the correspondence relations between the audio data and the tune, and includes the beat information, the chord information, and the melody information.

Figure 6:
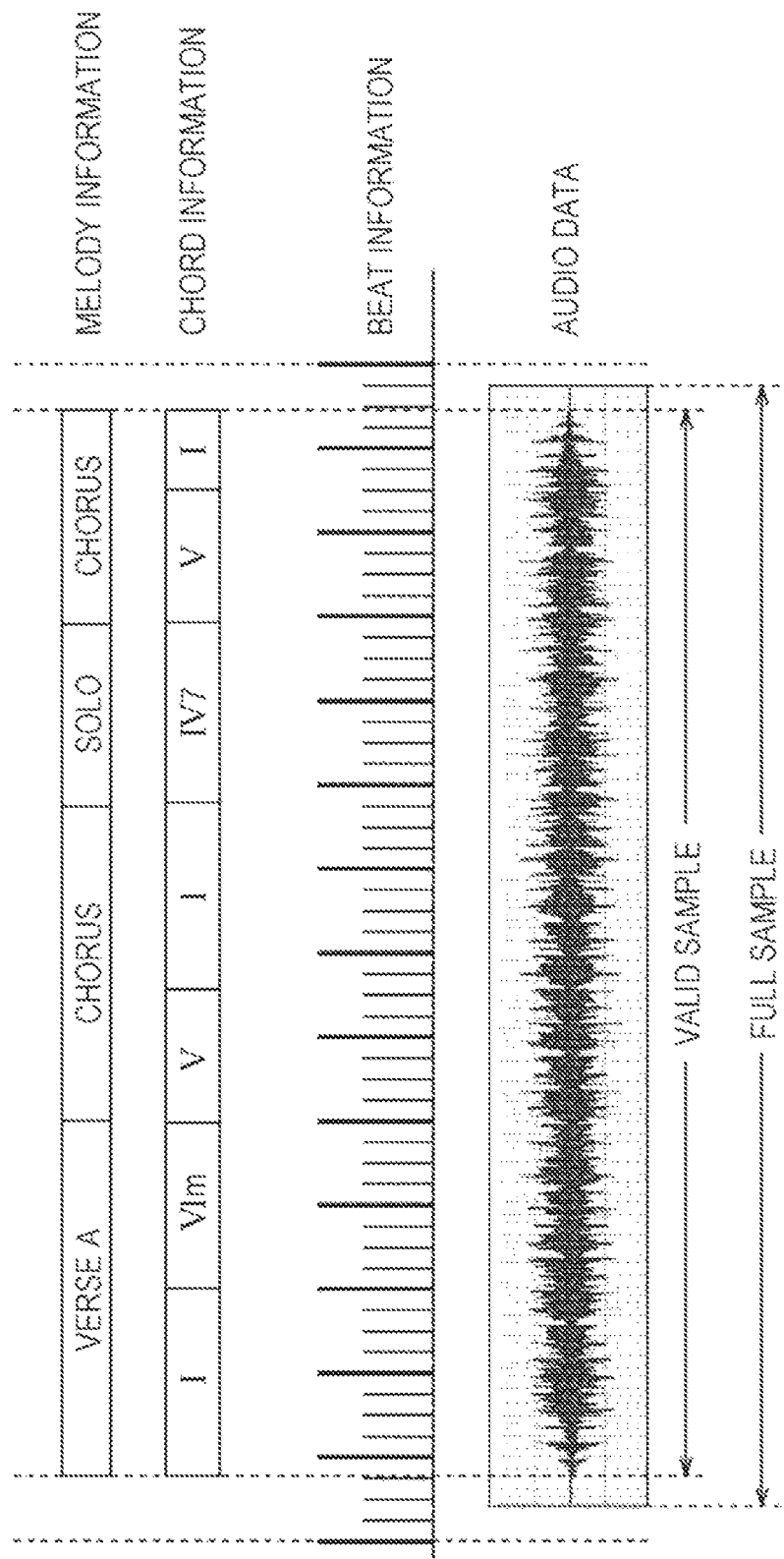
FIG. 6 is a diagram for describing beat information, chord information, and melody information.

Here, beat information, chord information, and melody information will be described, with reference to FIG. 6. Note that the waveform in the lower part of FIG. 6 indicates the waveform of the audio data, and of the range indicates as the full sample, the range indicated as the valid sample is the range over which tune data is actually recorded.

The beat information indicates the position of the bar and the beat of the audio data. To be more precise, the beat information indicates the start of the bar of the tune (hereinafter may also be referred to as the start of the bar), and sample positions of the other bars and beats of the audio data. In FIG. 6, a long vertical line, on the left side of the text "beat information", indicates the position of the start of the bar of the tune, and the position of the beat besides the start of the bar is indicated by a short vertical bar. Note that FIG. 6 illustrates an example of a tune in quadruple time, and the start of a bar appears every four beats.

Using this beat information, the position of the start of the bar and each beat of the audio data can be identified in increments of samples, and the predetermined region of audio data can be identified in increments of bars or beats. Furthermore, using the beat information, the average beat per minute (BPM) of a predetermined region of the audio data can be calculated based on Expression (1) described below.

$$\text{Average BPM} = Bn \times Fs / Sn \times 60 \quad (1)$$

Note that in Expression (1), Bn indicates the number of beats within the region, Fs indicates the sampling rate of the audio data, and Sn indicates the number of samples within the region.

The chord information indicates the chord progression of the tune, and also indicates the position of each chords in the audio data. To be more specific, as described in FIG. 6, the chord information indicates the type and the sample position of each chord, which appears in the tune. Using this chord information, the position of the audio data of each chord can be identified in increments of samples, and can set a predetermined region of the audio data in increments of chords. Also, positions of each chord of the tune can be set based on the chord information and beat information, in increments of beats.

Note that the types of chords indicated in the chord information are represented based on the relative position of the root of the chord as to the tonic of the scale of the tune, rather than using chord names. To be more specific, each chord is expressed with the root name portion of the chord name replaced with a number (and, if suitable, using the # or ♭ symbols) based on a degree which is the relative position of the tonic of the scale as to the root of the chord, such as for example, I, I#(or II♭), II, II# (or III♭), III, III# (or IV♭), IV, IV# (or V♭), V, V# (or VI♭), VI, VI# (or VII♭), and VII, VII# (or I♭).

For example, in the event the chord types are expressed by chord names, it is difficult to tell if the chord progression C, F, G, Am in C major in which the tonic (keynote) is C, at the upper side in FIG. 7, and the chord progression E, A, B, C#m in E major in which the tonic is E, at the lower side, would be similar or not if the key is transposed to the same key.

On the other hand, in the event the type of chord is shown based on the relative position of the tonic of the scale and the root of the chord, the two chord progressions are expressed as the same I, IV, V, VIm. Therefore, is easier to tell that the chord progressions match, in cases when each chords on the upper side are transposed four semitones up to E major, or when each of the lower side chords are transposed four semitones down to C major. In other words, relation of the chord progressions with different tonality between the audio materials will be more accurate, and in the event that the key is changed, it will be easier to tell if the chord progressions between the two audio materials are similar or not. Therefore, it is easier to calculate the degree of similarity of the chord progressions between the two audio materials, if the key is transposed to the same key with processing by a computer or the like.

Note that hereinafter, in order to distinguish between chords expressed with chord names, and chords expressed based on the relative position of the root of the chord as to the tonic of the scale, the former will be referred to as "absolute chord", and the latter will be referred to as "relative chord". Also, expressing the types of chords in terms of absolute chords will be referred to as "absolute expression", and expressing using relative chords will be referred to as to "relative expression". Moreover, hereinafter, in relative chords, a value indicating the relative position of the root of the chord as to the tonic in of the scale, with a number and, if appropriate, the # or ♭ symbol added thereto, will be referred to as "degree".

The melody information indicates the position of each melody element (hereinafter referred to as "melody block") in the audio data configuring the tune, as well as indicating the development of the melody. To be more specific, the melody information indicates types of melody blocks which appear in the tune such as illustrated in FIG. 6, such as the intro, verse A, verse B, the chorus, the interlude, the solo, the outro and so on, and sample positions of audio data of each melody block. Using this melody information, the position of each melody block of the audio data can be identified in increments of samples, and an optional section of audio data can be specified in increments of melody blocks. Also, based on the melody information and beat information, the position of each melody block in the tune can be identified in increments of beats.

FIG. 8 illustrates an example of the data configuration of the metadata, and FIG. 9 illustrates a specific example of metadata including the bar/beat No., attribute, and sample position.

In the bar/beat No. is set the value indicating the position of the beat in the tune. For example, in the case of a beat in the m'th beat of the n'th bar, the values n and m are set in the bar/beat No. For example, in the example illustrated in FIG. 9, the first line is the data of the first beat of the first bar, and the most bottom bar is the data of the second beat of the second bar. Note that n is an integer equal or greater than one, and in the event of a tune in k measure, m is an integer within the range of one through k.

In the attribute are set attributes such as beat information, melody information, chord information, and detailed data related to the attributes. For example, in the event the attribute indicates chord information, the attribute is set with a value indicating that the type of attribute is chord information, and a value indicating the type of chord displayed in the position of the sample position.

The sample position is set with a position of audio data corresponding with the metadata in increments of samples.

Note that for registration for the melody information, only the start position of each melody block is registered in the metadata, and for the chord information, only the start position of each chord is registered in the metadata. An arrangement may be made however, where information relating to the type of melody block and the type of chord as to each beat may be registered in the metadata.

Furthermore, besides the information described above, information that does not vary due to the temporal axis, such as the sampling frequency and the quantization bit rate, are registered to the metadata as information of the whole tune. Also, the key of the tune and the scale information is registered to the metadata as well. Note that in the event that the key, the scale, or the beat changes during the tune, information indicating the sample position of the change, the key and scale, or the measure, is registered in the metadata.

DJ Play Processing Executed by Music Remix System 101

Figure 10:
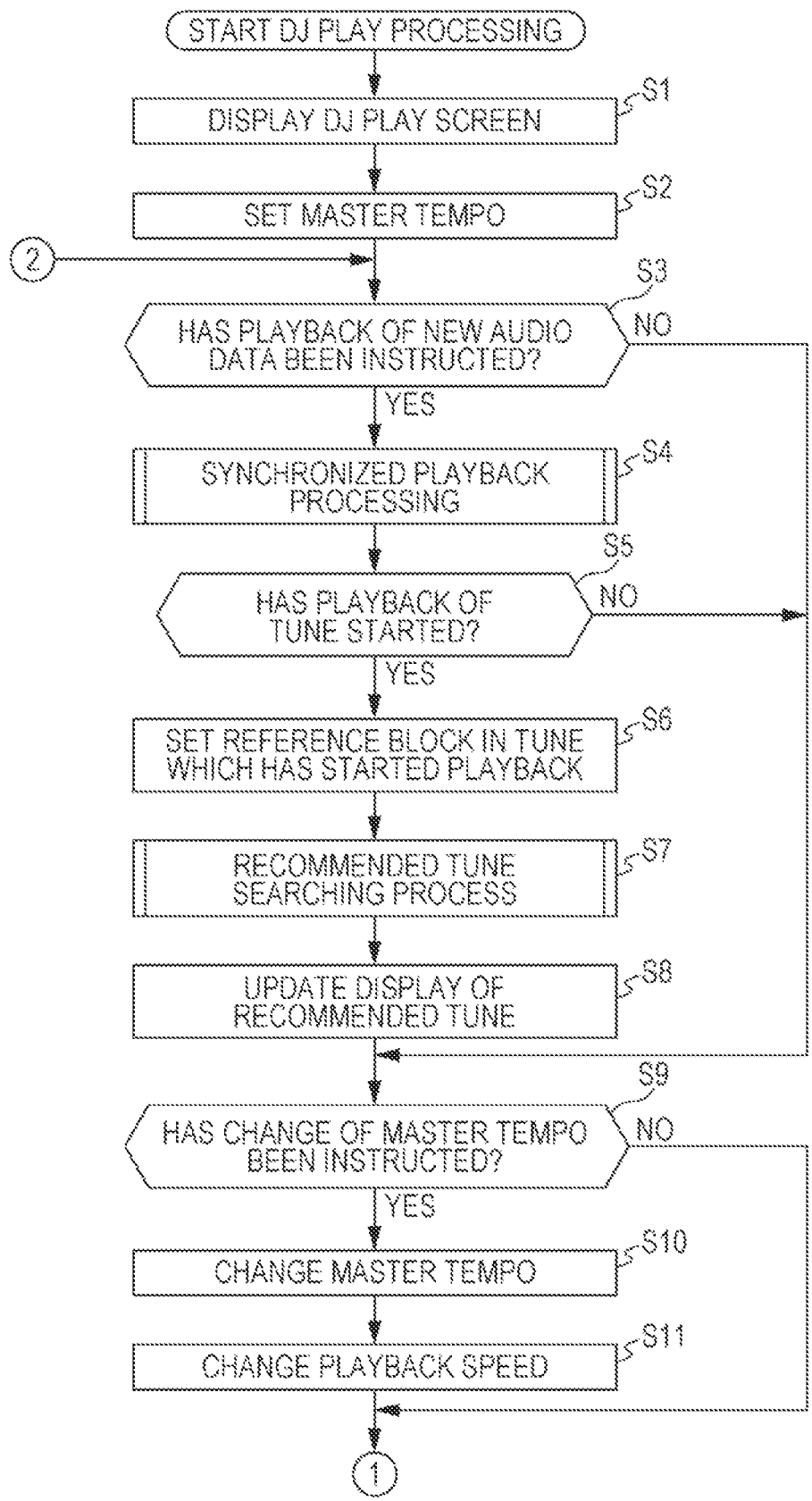
FIG. 10 is a flowchart for describing DJ play processing.
Figure 11:
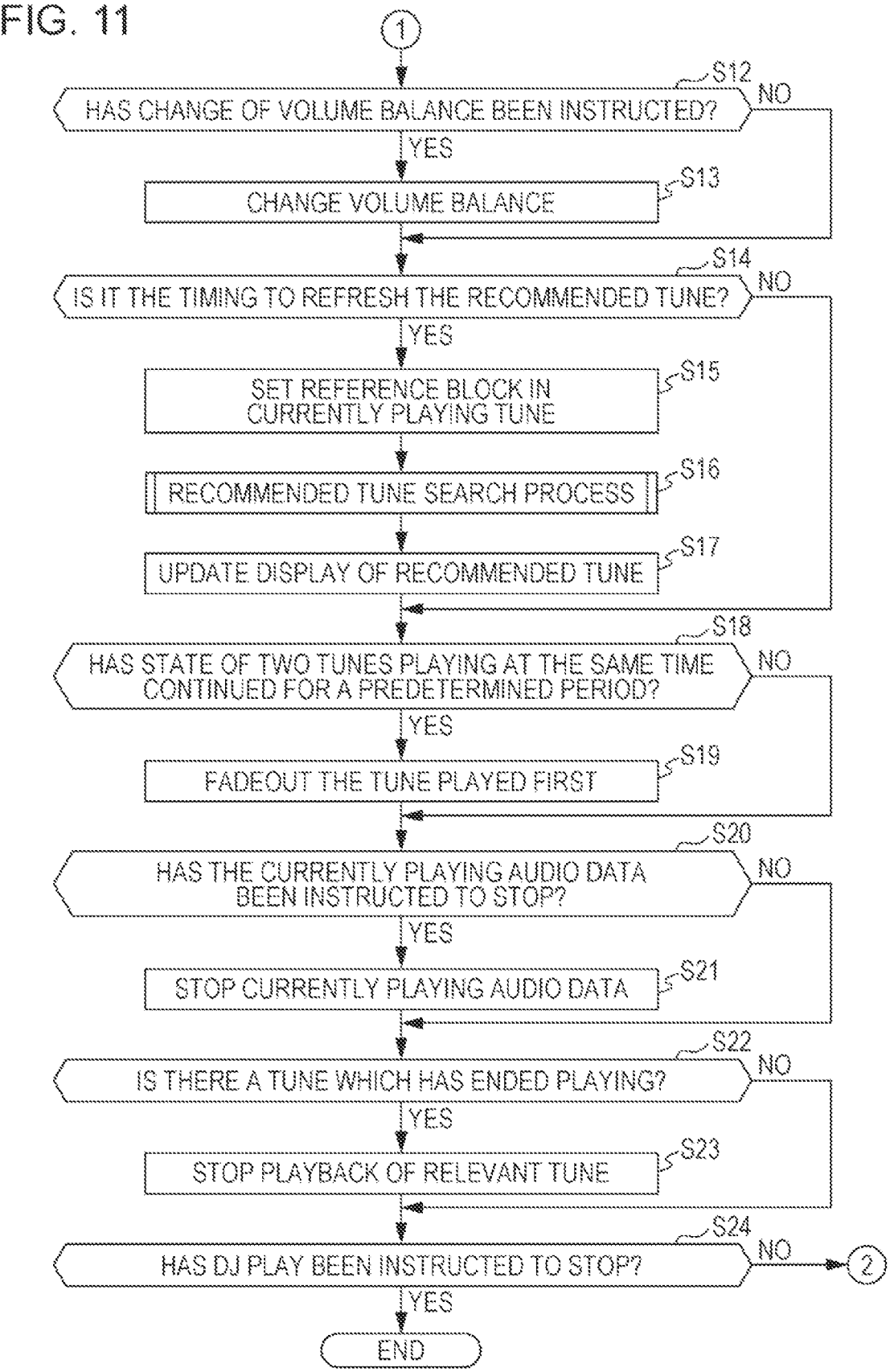
FIG. 11 is a flowchart for describing DJ play processing.

Next, with reference to FIGS. 10 and 11, the DJ playback processing executed by the music remix system 101 will be described. Note that this processing starts in the event that the user inputs an instruction to start the DJ play processing, via the operating unit 214, for example.

In step S1, the display unit 215 displays the DJ play screen, under the control of the display control unit 232.

Figure 12:
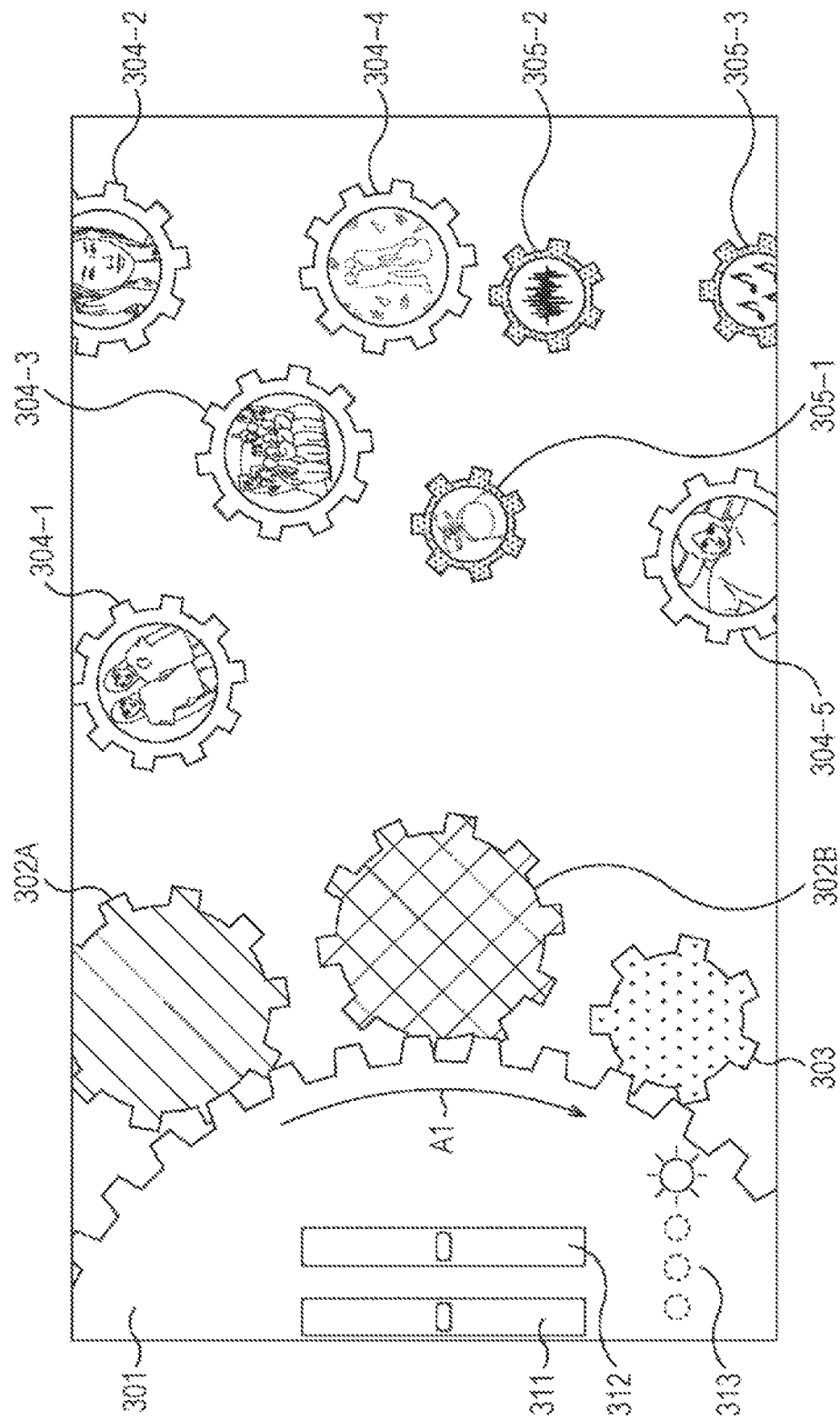
FIG. 12 is a diagram illustrating an example of a DJ play screen.

FIG. 12 illustrates an example of the DJ play screen displayed by the display unit 215. At the left edge of the DJ play screen is shown a portion of the main power gear 301. The main power gear 301, as shown with the arrow A1, rotates clockwise, synchronized with the master beat, and rotates at a speed correlated to the master tempo. To be more specific, each cog of the main power gear 301 represents a beat, and during the master beat proceeding one beat, the main power gear 301 rotates one pitch. Here, one pitch means the space between the adjacent cogs.

Around the main power gear 301, are the placeholders 302A through 303, smaller in diameter than the main power gear 301, placed at predetermined intervals. The placeholder 302A and placeholder 302B are the same size, and indicates the placement position of the tune gears 304-1 through 304-m, to mesh with the main power gear 301. The placeholder 303 is slightly smaller than the other two, and indicates the placement position of the material gear 305-1 through 305-n to mesh with the main power gear 301.

Also, placeholders 302A through 303 are each displayed in different kinds of aspect, to distinguish on one view. For example, the placeholders 302A through 303 are designed with different kinds of colors and patterns. Note that description will be made hereinafter regarding a case where the placeholders 302A through 303 have different colors.

In an audio gear yard at the right of the DJ play screen, there are different kinds of audio gears randomly placed, each corresponding to different audio data. There are two types of audio gears, which are tune gears 304-1 through 304-m and material gears 305-1 through 305-n, and the user can freely move these within the DJ play screen.

Note that in FIG. 12, only a portion of the tune gears 304-1 through 304-m and the material gears 305-1 through 305-n are shown. That is, although only five tune gears 304-1, 304-2, 304-3, 304-4 and 304-5 have been illustrated, any number m of tune gears may be included on the DJ play screen, with 304-m representative of an m-th tune gear, and, although only three material gears 305-1, 305-2 and 305-3 have been illustrated, any number n of material gears may be included on the DJ play screen, with 305-n representative of an n-th material gear. Also, hereinafter, in the event that the tune gears 304-1 through 304-m do not have to be individually distinguished, these will simply be referred to as "tune gear 304", and in the event that the material gears 305-1 through 305-n do not have to be individually distinguished, these will simply be referred to as "material gear 305".

Each tune gear 304 is individually correlated with a different tune or a portion of a tune, and set to a size corresponding to the placeholders 302A and 302B. As described later, by placing a predetermined tune gear 304 on the placeholder 302A or 302B, a tune or a portion of a tune corresponding to the tune gear 304 is played.

Figure 13:
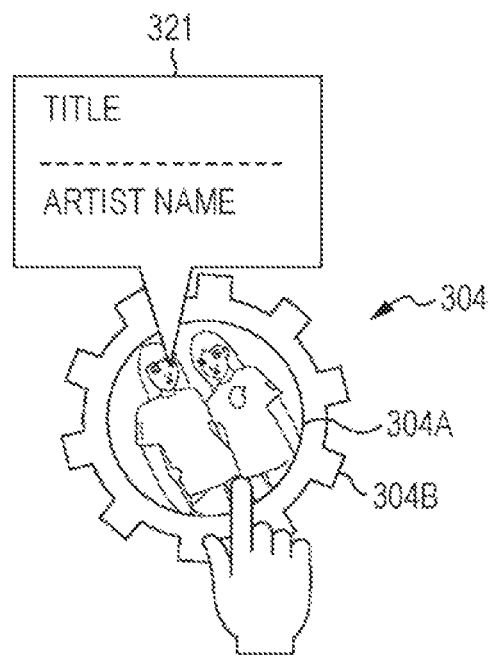
FIG. 13 is an enlarged diagram of a tune gear.

FIG. 13 is a close-up of the tune gear 304. The tune gear 304 is configured of a circular information display portion 304A at the middle, and a surrounding peripheral portion 304B on the outside. The information display portion 304A, for example, shows the cover art of an album or single corresponding to the tune of the tune gear 304, or a photo of the artist. Moreover, by pointing to the information display portion 304A with the cursor or finger, a balloon 321 with the title and the artist name which are correlated with the tune gear 304 appears.

Each cog of the peripheral portion 304B indicates a beat, and as described later, while the playback of the corresponding tune proceeds one beat, the main power gear 301 rotates one pitch.

Each material gear 305 is correlated with a different loop material, and set to match the size of the placeholder 303. As described later, by placing the predetermined material gear 305 on the placeholder 303, the loop material corresponding to the material gear 305 is played.

Figure 14:
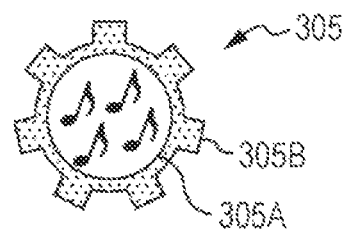
FIG. 14 is an enlarged diagram of a material gear.

FIG. 14 is a close-up of the material gear 305. The material gear 305 is configured of an information display portion 305A and peripheral portion 305B. The information display portion 305A, for example, displays a photograph or drawing or the like which represents the loop material corresponding to the material gear 305.

Each cog of the peripheral portion 305B indicates a beat, and as described later, while the corresponding loop material proceeds one beat, the material gear 305 rotates one pitch. Furthermore, the peripheral portion 305B is colored with a similar color to the placeholder 303. Thus, the user can intuitively comprehend that the placement position of the material gear 305 is the placeholder 303.

Figure 15:
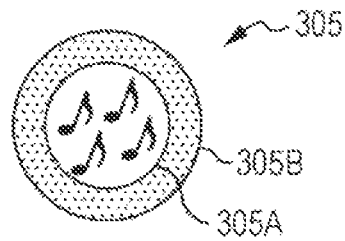
FIG. 15 is an enlarged diagram of another example of a material gear.

Note that as illustrated in FIG. 15, for the peripheral portion 305B of the material gear 305, there are no gears shown for gears correlated with loop materials which do not have any beat, and do not have to have synchronized playback. Examples of loop materials include sound effects mimicking natural sounds with no musical beat, such as the sound of the waves or the like.

Additionally, the peripheral portion 305B of material gears 305 that are related to loop materials that do not have any beat, but have to be played at the start of the bar, or, loop materials that have beat, but play at the original tempo without any relation with the master tempo, is shown with only one cog. Examples of such loop materials include artificial sounds with no rhythm.

Figure 16:
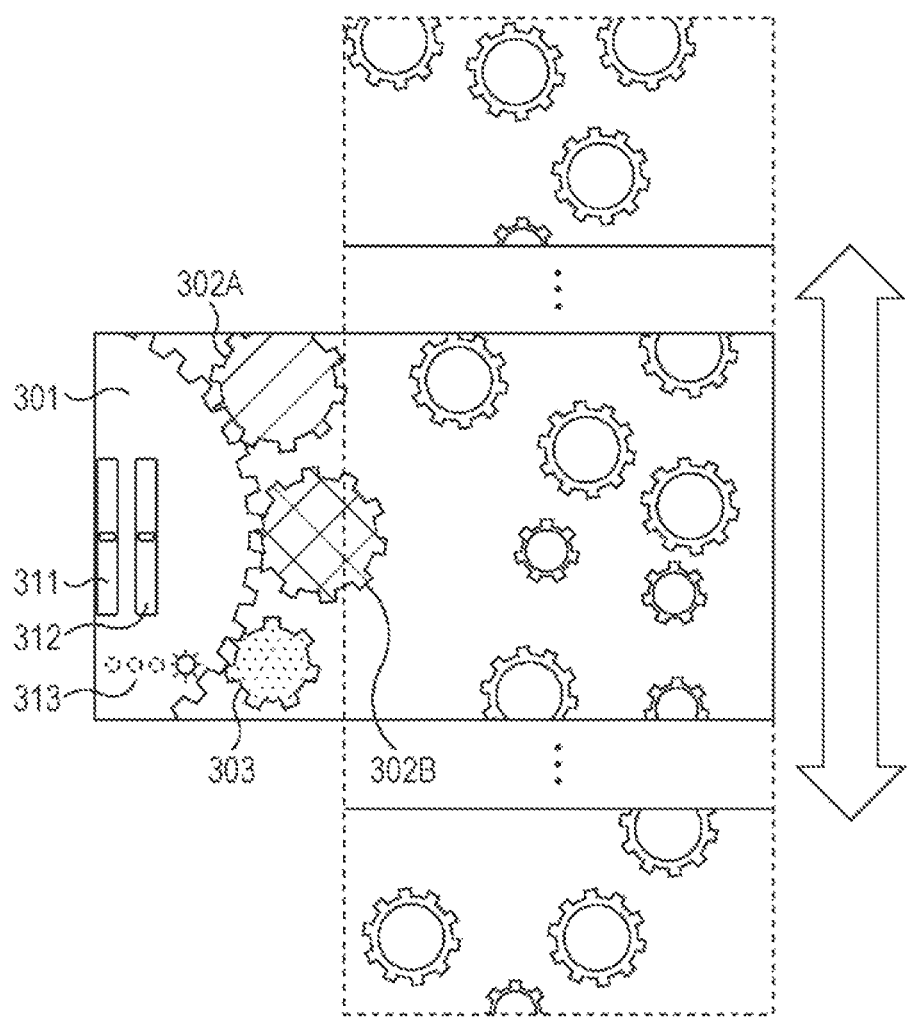
FIG. 16 is a diagram for describing a display method of tune gears and material gears.

Note that since the display space of the display unit 215 is limited, not all tune gear 304 and material gear 305 can be displayed. Accordingly, for example, as shown in FIG. 16, switching between the gears displayed on the display unit 215 can be realized by placing the tune gears 304 and material gears 305 in a virtual display space larger than the display space of the display unit 215, and scrolling the display region vertically, or switching pages.

Moreover, the main power gear 301 is not correlated with any tune or loop materials. Displayed inside the main power gear 301 are a volume slider 311, a tempo slider 312, and a bar/beat indicator 313.

The volume slider 311 is used to set the balance of the audio of the tunes placed on the placeholder 302A corresponding to tune gear 304 (hereinafter referred to as playback tone A), and the tunes placed on the placeholder 302B corresponding to tune gear 304 (hereinafter referred to as playback tone B). For example, raising the set position of the volume slider 311 raises the volume of playback tune A and lowers the volume of playback tune B, and on the other hand, lowering the set position of the volume slider 311 lowers the volume of playback tune A and raises the volume of playback tune B.

The tempo slider 312 is used to set the master tempo. For example, raising the set position of the tempo slider 312 speeds up the tempo, and on the other hand, lowering the set position of the tempo slider 312 slows down the tempo. Also, according to change in the master tempo, the rotational speed of the main power gear 301 changes, and so does the rotational speed of the gears meshing with the main power gear 301, which are the tune gear 304 and material gear 305.

The bar/beat indicator 313 indicates the progression of the bar of the remix line, and the beat. To be more specific, the bar/beat indicator 313 displays the number of indicators to the number of the number of beats of the remix line. FIG. 12 is illustrating an example of where the remix line is set in quadruple time, and four indicators are set. The most right of the four indicators is the indicator indicating the start of the bar of the remix line, and is set slightly larger than the other indicators.

Then, at the timing at the start of the bar of the remix line, the indicator at the right edge lights up. Subsequently, in time with the progression of the beat, the lit position of the indicator moves from the left edge to the right. Thereafter, at the timing at the start of the bar in the remix line, the indicator at the right edge lights up, and in time with the beat, processing of the lit position of the indicator moving from the left edge to the right is repeatedly performed.

In step S2, the music remix system 101 sets the master tempo. To be more specific, the playback control unit 261 sets the value of the master tempo corresponding to the set position of the tempo slider 312, to the master beat generating unit 281. The master beat generating unit 281 starts generation of the master beat, at the st master tempo.

In step S3, the playback control unit 261 determines whether an instruction of playback of a new audio data has been given or not. For example, in the event that the user operates the operating unit 214, and the predetermined tune gear 304 is placed on the placeholder 302A or placeholder 302B, the playback control unit 261 determines that the playback of the tune corresponding to the tune gear 304 has been instructed. Furthermore, in the event the user operates the operating unit 214 and the predetermined material gear 305 is placed in the placeholder 303, the playback control unit 261 determines that the playback of the loop material corresponding to the material gear 305 has been instructed.

In the event that the playback control unit 261 determines that playback of a new audio data (a tune or a loop material) has been instructed, the flow advances to step S4.

Figure 17:
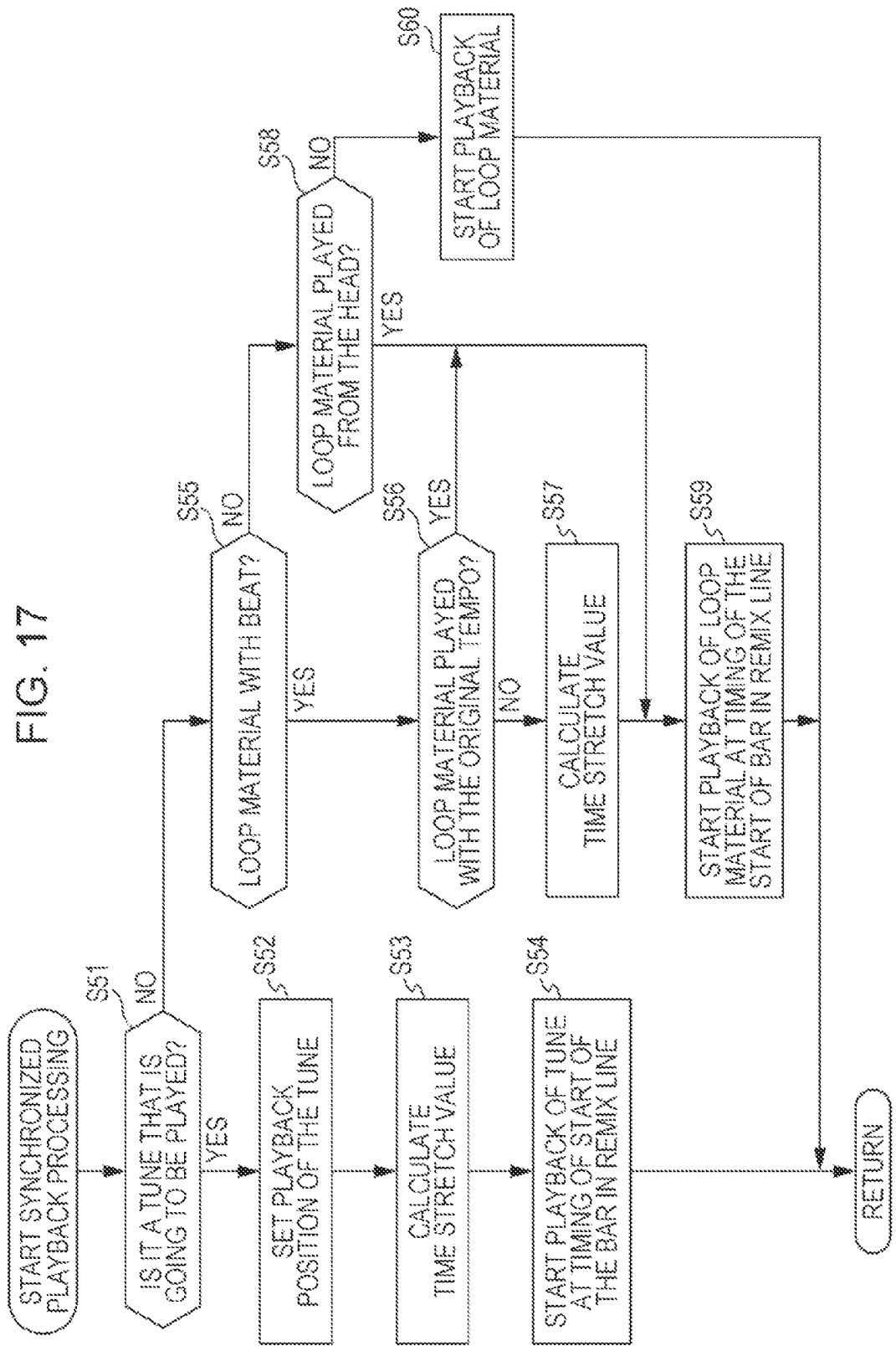
FIG. 17 is a flowchart for describing details of synchronized playback processing.

In step S4, the music remix system 101 executes synchronized playback processing. Here, details of synchronized playback will be described with reference to the flowchart in FIG. 17.

In step S51, the playback control unit 261 determines whether the audio that is going to be played is a tune or not. In the event that the audio that is going to be played is a tune, the flow advances to step S52.

In step S52, the playback control unit 261 sets the starting position of the tunes playback. To be more specific, in the event that the playback control unit 261 is going to play a new tune alone, the start of the tune is set as the playback starting point. Note that in the event that the newly played tune is a portion of a tune, the start of the portion of the tune is set as the playback starting point.

Note that a case of playing a new tune alone means a case, for example, when a new tune is going to be played from the state where the tune has not been played yet, or when playing a new tune instead of an old tune when only one tune is currently being played, regardless of whether or not there is playing of a loop material.

Also, in the case when the playback control unit 261 starts to play a new tune where it would overlap on the other tune currently being played, the playback control unit 261 searches for a region where the new tune where the score between the reference region is the greatest with the other tune (hereinafter referred to as "maximum score region"). The playback control unit 261 then sets the playback starting point to the start of the bar of the maximum region score corresponding to the bar of which is going to be played the next in the reference region in the new tune which is going to be played. For example, in the event the n'th bar from the start of the reference region is to be played next, the start of the n'th bar from the start of the maximum score region is set as the playback starting position.

Details of the reference region and the score will be described later.

In step S53, the playback control unit 261 calculates the time stretch value. To be more specific, first, the playback control unit 261 calculates the average BPM within a predetermined section from the playback starting position of the tune to be newly played, as the original tempo. Next, the playback control unit 261 calculates the time stretch value Vt, by subtracting the master tempo by the original tempo. The playback control unit 261 then provides the calculated time stretch value Vt to the audio signal generating unit 282.

In step S54, the music remix system 101 starts playback of tune at timing of the start of the bar of the remix line. To be more specific, the audio signal generating unit 282 starts playback of a new tune from the set playback starting position, in time with the next start of the bar of the remix line, based on the bar signal output from the master beat generating unit 281.

Also, the audio signal generating unit 282 plays the tune to be newly played at the playback speed of Vt times, based on the time stretch Vt calculated by the playback control unit 261. Accordingly, the tempo of the tune to be newly played matches the master tempo.

Therefore, when another tune has start playing while playback tune A or playback tune B is being played, both of the tunes are played synchronized. That is to say, both tunes are played such that the tempo and beat position match. In addition both tunes are played such that the start of the bar matches.

Note that in the event of playing one or the other of playback tune A and playback tune B, the tune is played where the start of the bar matches the start of the bar of the remix line, and the tempo matches the master tempo.

Moreover, the display unit 215 starts playback and display of the new tune, under control of the display control unit 232. Now, an example of the DJ play screen in a case of playing a new tune will be described with reference to FIGS. 18 and 19.

Figure 18:
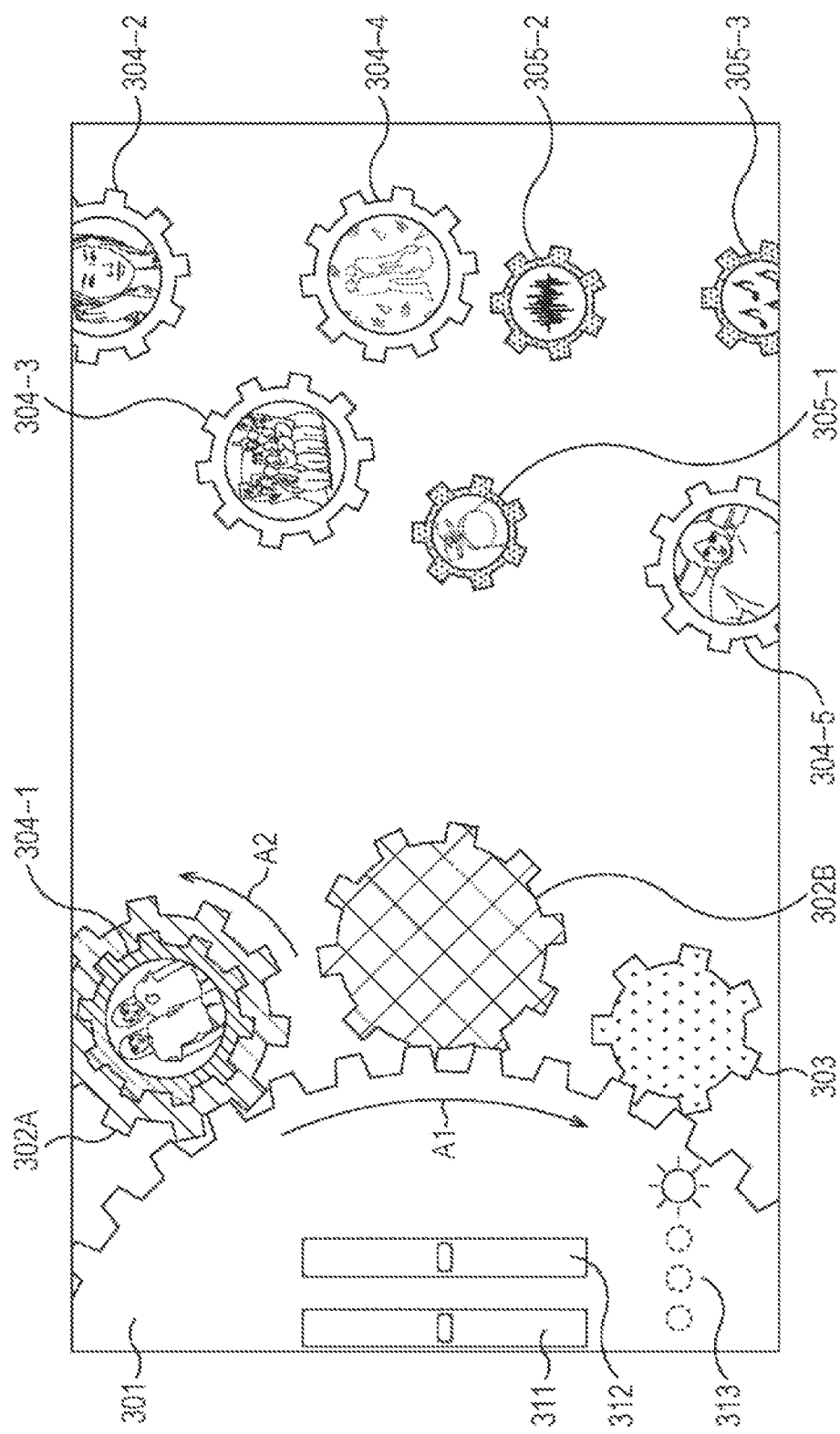
FIG. 18 is a diagram for describing a detailed example of synchronized playback processing.

First, with reference to FIG. 18, starting playback of tune corresponding to tune gear 304-1 (playback tune A) in the event of when the tune gear 304-1 is placed on the placeholder 302A will be described.

For example, as the playback of the playback tune A starts, the cogs of the main power gear 301 and the cogs of the placeholder 302A mesh, and via placeholder 302A, the cogs of the main power gear 301 and the cogs of the tune gear 304-1 mesh indirectly. The placeholder 302A then starts rotating in the direction of the arrow A2 with the tune gear 304-1, and the color of the placeholder 302A and the peripheral portion 304B of the tune gear 304-1 gradually gets darker.

Furthermore, according to the master beat, the progression of the beat of the playback tune A, and the rotation of the main power gear 301, the placeholder 302A and the tune gear 304-1 sync. In other words, while the beat of the playback tune A progresses one, due to the rotation of the main power gear 301, each gear rotates one pitch as the position of meshing of the main power gear 301 and the placeholder 302A and the tune gear 304-1 advances by one.

Next, with reference to FIG. 19, description will be made regarding a case when playback of the tune corresponding with the tune gear 304-4 (playback tune B) has been started by placing the tune gear 304-4 on the placeholder 302B while the playback tune A corresponding to the tune gear 304-1 that is placed on the placeholder 302A is being played.

For example, as the playback of the playback tune B starts, the cogs of the main power gear 301 and placeholder 302B mesh with each other, and the cogs of the main power gear 301 and the cogs of tune gear 304-4 mesh indirectly via the placeholder 302B. The placeholder 302B then starts rotating in the direction of the arrow A3 with the tune gear 304-4, and the color of the placeholder 302B and the peripheral portion 304B of the tune gear 304-4 gradually gets darker.

Furthermore, according to the master beat, the beat progression of the playback tune B syncs with the rotation of the main power gear 301, the placeholder 302B, and the tune gear 304-4. That is to say, while the beat of the playback tune B progresses one beat, each gear rotates one pitch worth due to the rotation of the main power gear 301, such that the meshing position of the cogs of the main power gear 301 and the cogs of the placeholder 302B and tune gear 304-4 advances by one.

Note that the placeholder 302A and tune gear 304-1 continue to rotate. Therefore, the placeholder 302A and the tune gear 304-1, and the placeholder 302B and the tune gear 304-4, mesh indirectly via the main power gear 301, and rotate at the same speed and the same direction in accordance with the rotations of the main power gear 301.

Note that in the event that the placeholder 302A has placed thereupon a tune gear 304 (hereinafter referred to as tune gear A), and another tune gear 304 (hereinafter referred to as tune gear B) is placed on the same placeholder 302A, the gear displayed at the placeholder 302A is replaced from the tune gear A to the tune gear B. Also, the tune gear A is relocated to the tune gear yard. Further, after the tune corresponding to the tune gear A has been stopped, playback of the tune corresponding to the tune gear B starts.

In the same way, in the event that the placeholder 302B has placed thereupon a tune gear 304 (hereinafter referred to as tune gear C), and another tune gear 304 (hereinafter referred to as tune gear D) is placed on the same placeholder 302A, the gear displayed at the placeholder 302B is replaced from the tune gear C to the tune gear D. Also, the tune gear C is relocated to the tune gear yard. Further, after the tune corresponding to the tune gear C has been stopped, playback of the tune corresponding to the tune gear D starts. The synchronized playback processing then ends.

On the other hand, in the event that determination is made in step S51 that the audio of which playback is to be started is not a tune but a loop material, the flow advances to step S55.

In step S55, the playback control unit 261 determines whether the loop material that is going to be played is a loop material with beat or not. In the event that the loop material is determined to be a loop material that has beat, the flow advances to step S56.

In step S56, the playback control unit 261 determines whether the loop material that is going to be played is a loop material that plays on its original tempo or not. In the event that the loop material is determined to be a loop material that does not play on its original tempo, in other words, if the loop material is determined to be a loop material played alongside with the master tempo, the flow advances to step S57.

In step S57, the playback control unit 261 calculates the time stretch value. To be more specific, first, the playback control unit 261 calculates the newly played loop materials average BPM as an original tempo. The playback control unit 261 then calculates the time stretch value Vt as the value subtracted the master tempo by the original tempo. The playback control unit 261 then provides the calculated time stretch value Vt to the audio signal generating unit 282. The flow then advances to step S59.

On the other hand, in the event that determination is made in step S56 that this is loop material that plays at its original tempo, step S57 is skipped, and the flow advances to step S59.

Also, in step S55, in the event that the loop material is determined not to have beat, the flow advances to step S58.

In step S58, the playback control unit 261 determines whether or not the loop material that is going to be played is loop material to be played from the start of the bar. If the loop material is determined to be a loop material that is to be played from the start of the bar, the flow advances to step S59.

In step S59, the music remix system 101 starts the playback of the loop material at timing of the start of the bar of the remix line. To be more specific, the audio signal generating unit 282 starts the playback of the new loop material form the top of the bar, in time with the start of the next bar on the remix line, based on the bar signal output from the master beat generating unit 281.

Also, in the case of a loop material with a beat, which is to be played following the master tempo, the audio signal generating unit 282 plays the loop material to be newly played at a playback speed of playback speed Vt times, based on the time stretch Vt calculated by the playback control unit 261. Thus, the tempo of the loop material to be newly played is made to match the master tempo.

Accordingly, in the event that playback of this loop material is started while playing at least one of playback tune A and playback tune B, synchronized playback of the tune being played and the loop material is performed. That is to say, playback of the tune and the loop material is performed so that the tempo and beat position match. In addition, playback of the tune and the loop material is performed so that start of a bar matches.

On the other hand, in the event of a loop material which is to be played at its original tempo, or loop material with no beat, the audio signal generating unit 282 plays the loop material to be newly played at its original tempo with no change.

Accordingly, in the event that playback of this loop material is started while playing at least one of playback tune A and playback tune B, only the start of a bar is matched with the tune being played, and played unsynchronized, unrelated to the tempo and beat position of this tune.

Also, the display unit 215 starts playback display of the new loop material, under control of the display control unit 232. Now, an example of a DJ play screen will be described with regard to a case of playback of new loop material, with reference to FIG. 20.

Figure 20:
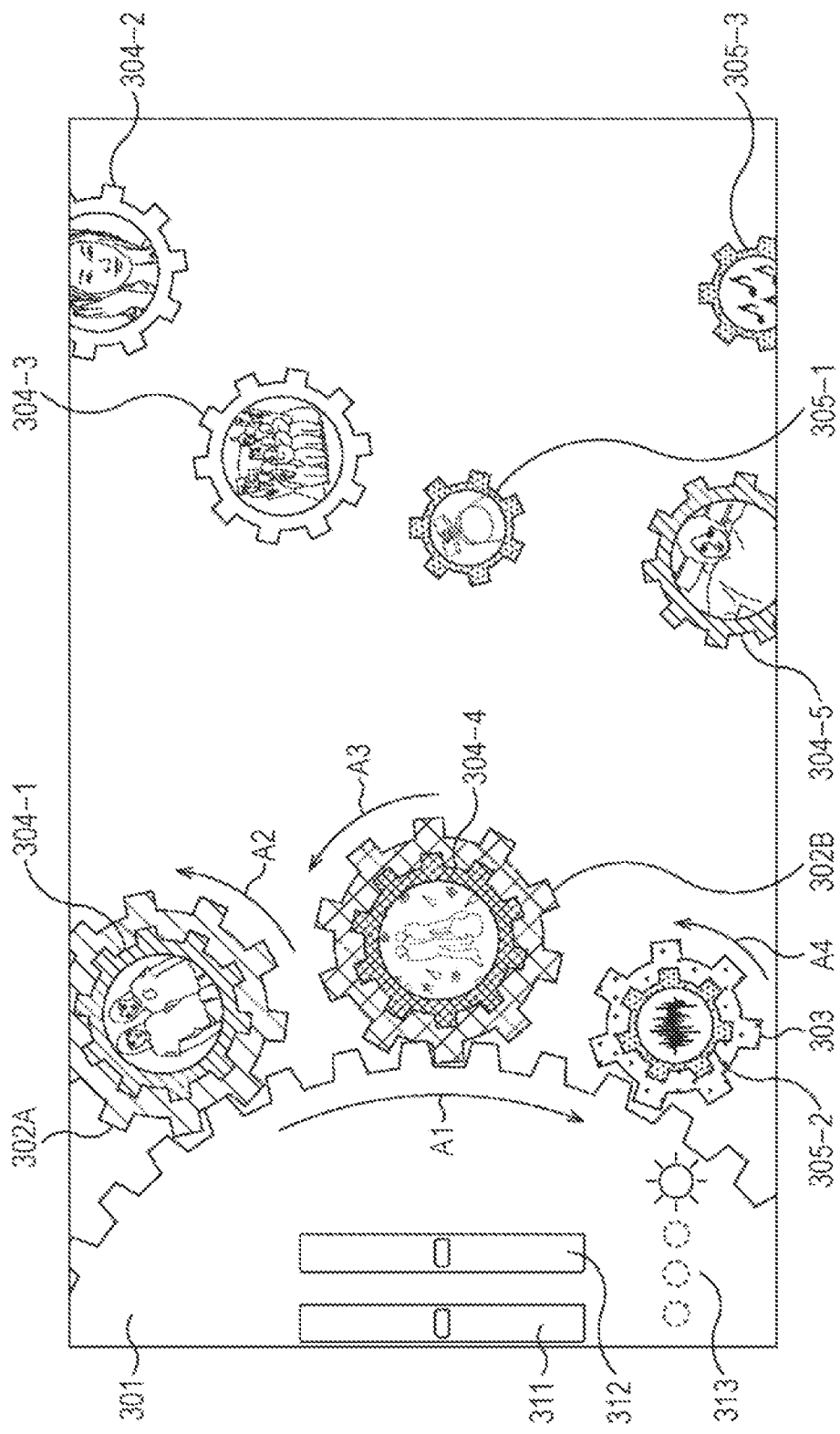
FIG. 20 is a diagram for describing a detailed example of synchronized playback processing.

FIG. 20 illustrates an example of a case of starting playback of loop material corresponding to material gear 305-2 (hereinafter also referred to as "new loop material"), by placing the material gear 305-2 on the placeholder 303 during playback of playback tune A corresponding to the tune gear 304-1 placed at the placeholder 302A and playback of playback tune B corresponding to tune gear 304-4 placed at the placeholder 302B.

For example, simultaneously with starting of playback of the new loop material, the cogs of the main power gear 301 and placeholder 303 mesh, and the cogs of the main power gear 301 and the material gear 305-2 indirectly mesh via the placeholder 303. The placeholder 303 and the material gear 305-2 both start rotating in the direction indicated by the arrow A4.

Also, in the case the new loop material is a loop material with a beat, which is to be played following the master tempo, progression of the beat of the loop material and rotation of the main power gear 301, placeholder 303, and material gear 305-2 are synchronized in accordance with the master beat. That is to say, during the progress of one beat of the new loop material, the gears each rotate by one pitch worth due to rotation of the main power gear 301, so that the position where a cog of the main power gear 301 and the cogs of the placeholder 302B and material gear 305-2 mesh advances by one.

The new loop material is repeatedly played consecutively. That is to say, upon playback of the new loop material ending, playback of the new loop material is resumed in accordance with the start of the bar at the next remix line.

Note that in a case where the new loop material is a loop material which has a beat but is to be played at its original tempo, or a loop material which does not have a beat but is to be played from the start of a bar in the remix line, and the corresponding material gear 305 has only one cog, the gears rotate such that the cogs of the main power gear 301 and this material gear 305 mesh at the start of each bar in the remix line.

Also, in the event that another material gear 305 (hereinafter referred to as material gear B) is placed at the placeholder 303 where the material gear 305 (hereinafter also referred to as material gear A) has been paled, the gear displayed at the placeholder 303 is switched from the material gear A to the material gear B. Also, the material gear A is moved to the audio gear yard. Further, after playback of the tune corresponding to material gear A stops, playback of the tune corresponding to the material gear B starts. Thereafter, synchronized playback processing ends.

On the other hand, in the event that determination is made in step S58 that this is not loop material to play from the start of the bar, i.e., in the event that determination is made that this is loop material that may be played from any position of the bar, the flow advances to step S60.

In step S60, the music remix system 101 starts playback of loop material. That is to say, regardless of the position on the remix line, the audio signal generating unit 282 starts playback of the new loop material from the start, and subsequently repeatedly and consecutively plays the loop material.

Accordingly, in a case where playback of this loop material has started while playing at least one of playback tune A and playback tune B, the loop material is played unsynchronized, with the tempo, beat position, and bar start unrelated to this tune being played. Also, in the same way as with the case described above with reference to FIG. 20, the display unit 215 starts playback display of the new loop material, under control of the display control unit 232.

Note however, this is a case where the new loop material is loop material which has no beat and which does not have to be played from the start of a bar in the remix line, and the corresponding material gear 305 is such as illustrated in FIG. 15. Accordingly, the main power gear 301 and the material gear 305 do not mesh cogs, and a display is made like the material gear 305 turning due to friction from rotation of the main power gear 301. Thereafter, the synchronized playback processing ends.

Returning to FIG. 10, in step S5, the playback control unit 261 determines whether or not that which has started playback is a tune. In the event that determination is made that that which has started playback is a tune, the flow advances to step S6.

In step S6, the similarity calculating unit 241 sets a reference block in the tune regarding which playback has been started. For example, in the tune of which playback has been started by the processing in step S4, the similarity calculating unit 241 sets a predetermined number of bars starting at the bar where playback was started (e.g., eight bars) as a reference block.

Figure 21:
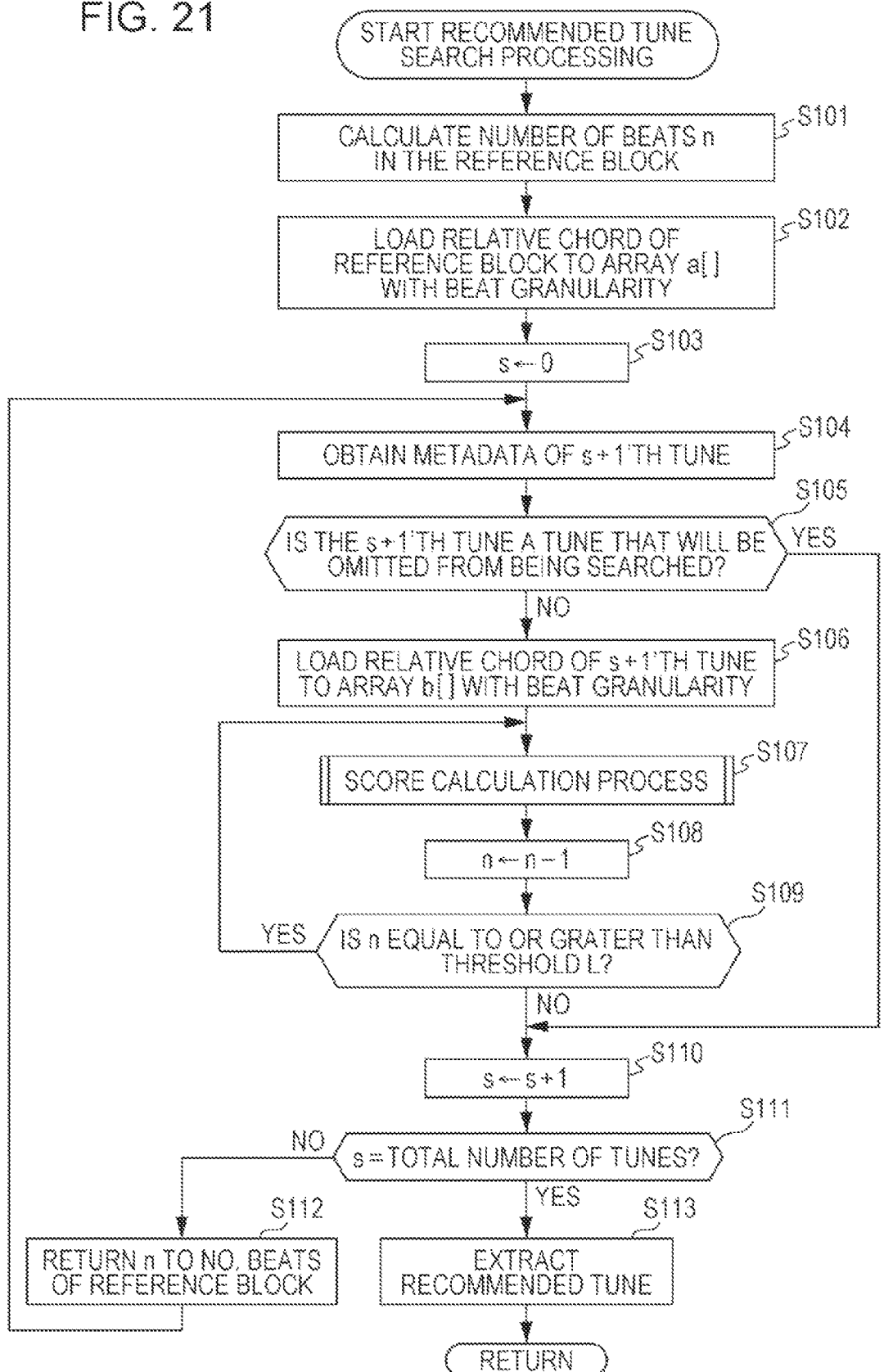
FIG. 21 is a flowchart for describing details of recommended tune search processing.

In step S7, the audio material searching unit 231 executes recommended tune search processing. Details of the recommended tune search processing will be described here with reference to the flowchart in FIG. 21.

In step S101, the similarity calculating unit 241 obtains metadata of the tune including the reference block (hereinafter also referred to as reference tune) from the audio metadata storage unit 217, and obtains the beat count n of the reference block, based on the obtained metadata.

In step S102, the similarity calculating unit 241 loads the relative chord of the reference block to the array a [ ] of beat granularity. Specifically, the similarity calculating unit 241 obtains the relative chord at each beat of the reference block, based on the metadata of the relative tune, and substitutes this into an array a [ ] of length n. That is to say, the relative chord at the start beat of the reference block is substituted into a [0], the relative chord at the second beat is substituted into a [1], and so on, till the relative chord at the n'th beat is substituted into a [n−1].

In step S103, the similarity calculating unit 241 substitutes zero into the variable s.

In step S104, the similarity calculating unit 241 obtains, from the audio metadata storage unit 217, metadata of the s+1'th tune (hereinafter, also referred to as searched tune).

In step S105, the similarity calculating unit 241 determines whether or not the s+1'th tune is a tune to be excluded from searching. In the event that the s+1'th tune, i.e. the searched tune does not fall under predetermined exclusion conditions, the similarity calculating unit 241 determines that the s+1'th tune is not a tune to be excluded from searching, and the flow advances to step S106.

In step S106, the similarity calculating unit 241 loads the relative chord of the s+1'th block to an array b [ ] of beat granularity. Specifically, the similarity calculating unit 241 obtains the relative chord corresponding to each beat of the s+1'th tune which is the searched tune, based on the metadata of the searched tune, and substitutes this into the array b [ ]. That is to say, if the beat count of the searched tune is m, the relative chord at the start beat of the searched tune is substituted into b [0], the relative chord at the second beat is substituted into b [1], and so on, till the relative chord at the m'th beat is substituted into b [m−1].

Figure 22:
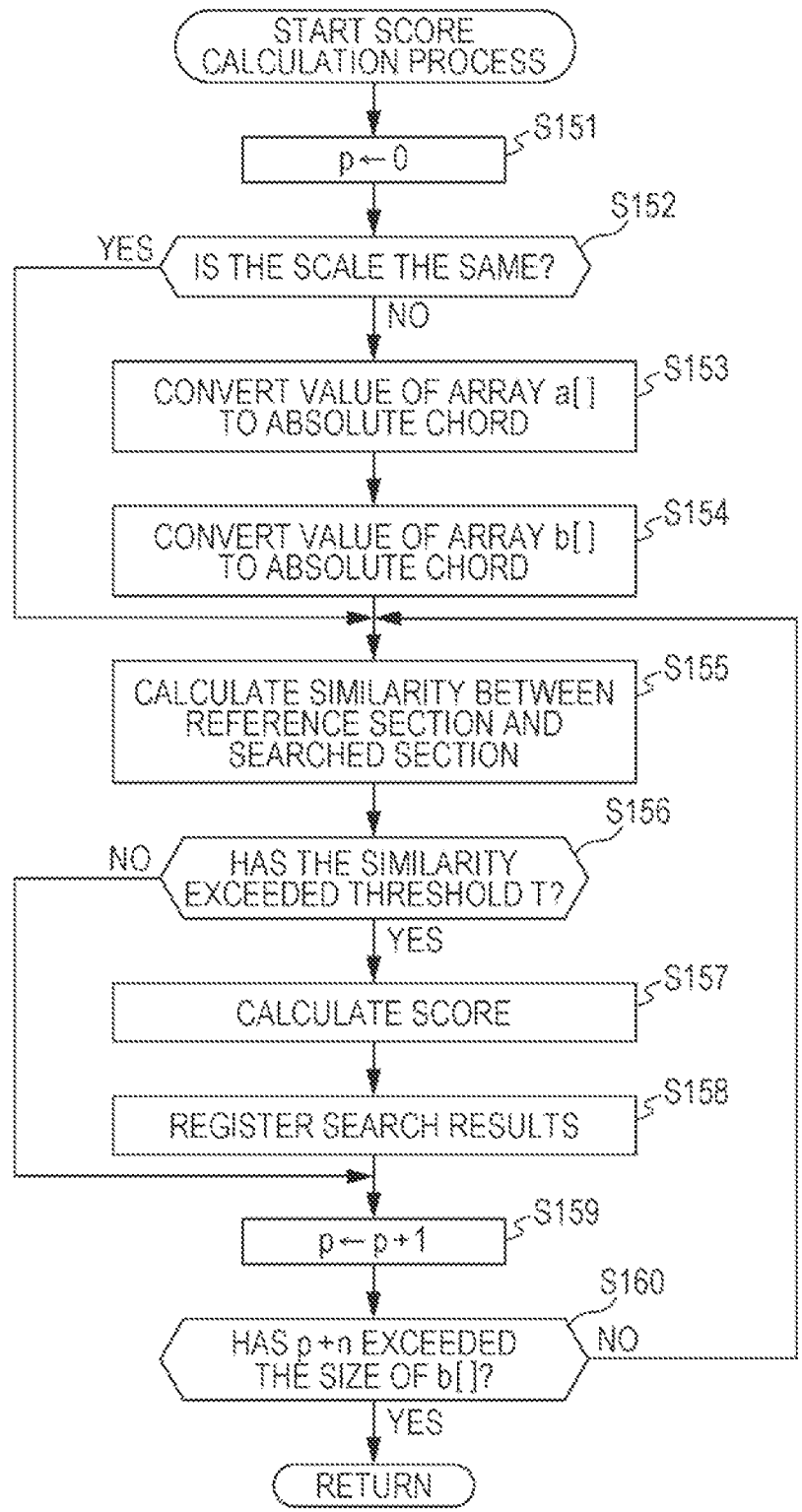
FIG. 22 is a flowchart for describing details of score calculating processing.

In step S107, the audio material searching unit 231 executes score calculation processing. Now, details of score calculation processing will be described with reference to the flowchart in FIG. 22.

In step S151, the similarity calculating unit 241 substitutes 0 in to the variable p.

In step S152, the similarity calculating unit 241 determines whether or not the scale is the same. Now, the term reference section means a section from element a [0] through a [n−1] of array a [ ], and the term searched section means a section from element b [p] through b [p+n−1] of array b [ ]. In the event that one of the reference section and searched section is in a major key and the other is in a minor key, based on the metadata of the reference tune and searched tune, the similarity calculating unit 241 determines that the scales of the two tunes are not the same, and flow advances to step S153.

In step S153, the similarity calculating unit 241 performs conversion of the value of array a [ ] into absolute chord. In step S154, the similarity calculating unit 241 performs conversion of the value of array b [ ] into absolute chord.

On the other hand, in step S152, in the event that both of the reference section and searched section are in a major key or in a minor key, the similarity calculating unit 241 determines that the scales of the two tunes are the same, the processing of steps S153 and S154 is skipped, and the flow advances to step S155.

In step S155, the similarity calculating unit 241 obtains the similarity between the reference section and searched section. The similarity calculating unit 241 obtains the similarity Rab between the reference section and searched section, based on the following Expressions (2) and (3).

$$Rab = \sum_{i=0}^{n-1} f(a[i], b[p+i]) \quad (2)$$

-continued $$f(x, y) = \begin{cases} 0 & \begin{pmatrix} \text{case where degree of relative} \\ \text{chord or root of absolute chord} \\ \text{is the same, and both are in} \\ \text{major chord or minor chord} \\ \text{relation} \end{pmatrix} \\ MatrixR[x][y] & \text{otherwise} \end{cases} \quad (3)$$

Note that MatrixR[x][y] in Expression (3) illustrates the value of an x-row-and-y-column'th element of a predetermined similarity matrix defining the similarity between each chord. A similarity matrix is a matrix defining similarity between the chords, with points set in the spaces in the matrix, based on the similarity between the chords. Several examples of similarity matrices will be described here.

FIG. 23 illustrates an example of a similarity matrix used in a case where the reference section and searched section are both major chords. Note that the line No. and column No. of the similarity matrix in FIG. 23 are illustrated by scale degree of relative chords. Accordingly, in the event that the scale degree of relative chords of element a [i] and element b [i+p] is the same, 10 points, which is the highest score, are given. Also, taking into consideration the existence of substitute chords having similar resonance, in the event that the relative chords of element a [i] and element b [i+p] are in a substitute chord relation, i.e., when one is a relative chord and the other is a substitute chord, or more particularly when relative chords of element a [i] and element b [i+p] are in a substitute chord relation when the key of the reference section and searched section is matched, 5 points are given. For example, in the event that the scale degree of relative chord of element a [i] is I and the scale degree of relative chord of element b [i+p] is III, 5 points are given. Otherwise (indicated by blank spaces in the matrix) zero points are given.

FIG. 24 illustrates an example of a similarity matrix used in a case where the reference section and searched section are both minor chords. Note that the line No. and column No. of the similarity matrix in FIG. 24 are illustrated by scale degree of relative chords, the same as with the similarity matrix in FIG. 23. Accordingly, with the similarity matrix in FIG. 24, in the event that the scale degree of relative chords of element a [i] and element b [i+p] is the same, 10 points, which is the highest score, are given, the same as with the similarity matrix in FIG. 23. Also, in the event that the relative chords of element a [i] and element b [i+p] are in a substitute chord relation, 5 points are given. Otherwise (indicated by blank spaces in the matrix) zero points are given. Note however, that substitute chords differ between major and minor, so FIGS. 23 and 24 are different matrices.

FIG. 25 illustrates an example of a similarity matrix used in a case where the scale is not the same for the reference section and searched section. The line No. and column No. of the similarity matrix in FIG. 25 are illustrated by the name of the root of the absolute chord. With the similarity matrix in FIG. 25, in the event that the root of absolute chords of element a [i] and element b [i+p] is the same, 10 points are given, and otherwise (indicated by blank spaces in the matrix) zero points are given. Thus, in the event that the scale is not the same for the reference section and searched section, similarity is obtained based on absolute chords. The reason is that in the event that the scale is not the same for the reference section and searched section, even if the type of relative chord is the same the type of chord may differ when converted into absolute chord, while even if the type of relative chord is different the type of chord may becomes the same when converted into absolute chord, due to difference in scale.

Thus, in the event that both the reference section and searched section are major or both or minor, the similarity is calculated based on the relative scale degree of root of each chord as to the tonic of the scale in each section, and in the event that one section is major and the other is minor, the similarity is calculated based on the pitch of the absolute pitch of each chord.

Note that, as indicated in Expression (3), in the event that the scale is the same between the reference section and searched section, and the scale degree of relative chords of element a [i] and element b [i+p] is the same and are in a major/minor relation, or, in the event that the scale is not the same between the reference section and searched section, and the root of absolute chords of element a [i] and element b [i+p] is the same and are in a major/minor relation, zero points are given. The reason is as follows. If we say that relative chords are the same I chord, if one is I and the other Im, the third note with the former is a major third from the root while the third note with the latter is a minor third from the root. These two sounds are only a half step apart, so if these two chords are sounded together, it will sound like a discord. On the other hand, in the event that the scale degree of relative chords or the root of absolute chords of the element a [i] and element b [i+p] are not the same, simply being in a major/minor relation does not alone mean that this will result in a discord, so points are obtained based on a similarity matrix.

Note that FIGS. 23 through 25 are an example of similarity matrices, and similarity matrices are not restricted to this example. For example, points to be given may be classified in further detail according to combinations of chords. The similarity matrices for minor scale may be classified in further detail, according to detailed scale classification such as melodic minor scale, harmonic minor scale, natural minor scale, and so forth. Note that even if the number of types of similarity matrices increases, the similarity matrices only have to be prepared once, and the similarity can then be obtained from the above-described Expressions (2) and (3).

Returning to FIG. 22, the similarity calculating unit 241 determines in step S156 whether or not the similarity has exceeded a threshold value T. In the event that the similarity has exceeded a predetermined threshold value T, that is to say, in the event that the similarity in chord progression between the reference section and the searched section is high, the flow advances to step S157.

In step S157, the score calculation unit 242 calculates the score. Specifically, the similarity calculating unit 241 supplies the calculated similarity to the score calculation unit 242. The score calculation unit 242 calculates the score by multiplying by similarity by weighting based on predetermined conditions. For example, in the vent that there is an element indicating that the similarity between the reference tune and the searched tune is low, such as the difference in tempo between the reference tune and the searched tune being no less than a predetermined threshold value or the scale between the reference tune and the searched tune not being the same, the similarity calculating unit 241 multiples the similarity by weighing smaller than 1, so the score will become lower.

In step S158, the score calculation unit 242 registers the search results. Specifically, the score calculation unit 242 classifies the search section regarding which the score has been calculated, and the score thereof, for each tune, and stores this in the audio metadata storage unit 217.

On the other hand, in the event that determination is made in step S156 that the similarity has not exceeded a predetermined threshold value T, that is to say, in the event that the similarity in chord progression between the reference section and the searched section is low, the processing of steps S157 and S158 is skipped, and the flow advances to step S159. That is to say, the score of the searched section is set to 0.

In step S159, the similarity calculating unit 241 increments the value of variable p by 1.

In step S160, the similarity calculating unit 241 determines whether or not p+n has exceeded the size of array b [ ]. In the event that determination is made that p+n has not exceeded the size m of array b [ ], i.e., in the event that the section from the p'th to the last beat in the searched tune is equal to or greater than the beat count n of the reference section, the flow returns to step S155.

Figure 26:
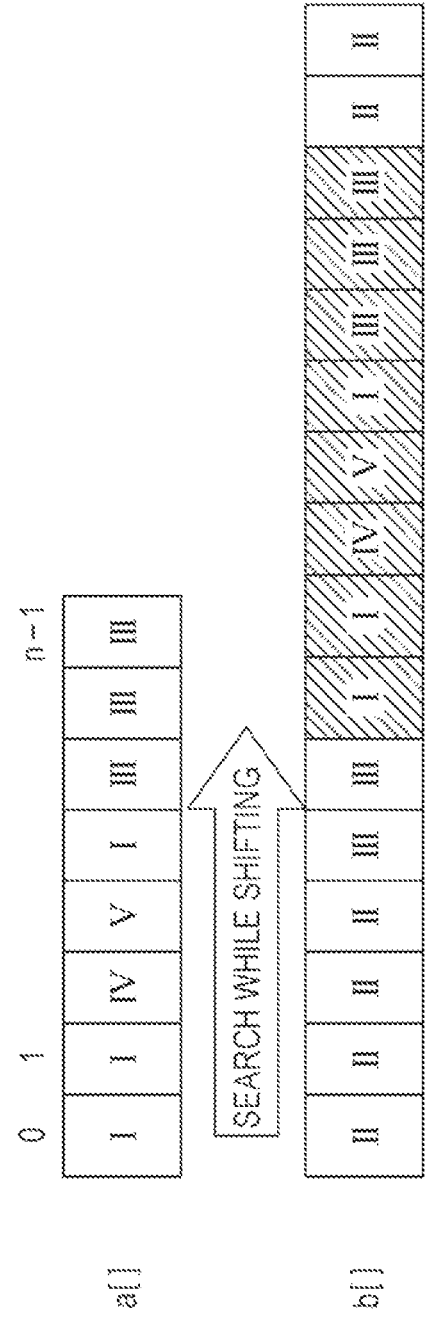
FIG. 26 is a diagram illustrating transitioning between search object sections.

Subsequently, in step S160, the processing of steps S155 through S160 is repeatedly executed, until determination is made that p+n has exceeded the size of array b [ ]. That is to say, as illustrated in FIG. 26, score based on the similarity for each searched section as to the reference section (section from a [0] to a [n]), which shifting the searched section (section from b [p] through b [p+n−1]) one beat at a time from the top of array b [ ], thereby searching for a section in the searched tune where the similarity in chord progression with the reference section is high.

On the other hand, in the event that determination is made in step S160 that the value of p+n has exceeded the size of the array b [ ], i.e., in the event that the section from the p'th to the last beat in the searched tune is now less than the beat count n of the reference section, score calculation processing ends.

Returning to FIG. 21, in step S108, the similarity calculating unit 241 decrements the value of n by 1.

In step S109, the similarity calculating unit 241 determines whether or not n is equal to or greater than a threshold L. In the event that determination is made that n is equal to or greater than threshold L, the flow returns to step S107.

Subsequently, the processing of steps S107 through S109 is repeatedly executed until determination is made in step S109 that n is smaller than threshold L. That is to say, searching is repeatedly performed for a section in the searched tune where similarity in chord progression with the reference section is high, while shortening the length of the reference section one beat at a time, until n is smaller than threshold L.

On the other hand, in the event that determination is made in step S109 that n is smaller than threshold L, the flow returns to step S110.

Also, in the event that the searched tune falls under a predetermined exclusion condition in step S105, the similarity calculating unit 241 determines that the s+1'th tune is a tune to be excluded from being searched, so steps S106 through S109 are skipped, and the flow advances to step S110. Note that examples of conceivable conditions of tunes to be excluded from searching include a tune which is the same as the reference tune, a tune with a different meter from the reference tune, a tune of which the difference in tempo as to the reference tune is not smaller than a predetermined threshold value, and so forth, and may be set by the user as appropriate.

In step S110, the similarity calculating unit 241 increments the value of s by 1.

In step S111, the similarity calculating unit 241 determines whether or not the value of s is equal to the total number of tunes. In the event that determination is made that the value of s is not equal to the total number of tunes, i.e., in the event that not all tunes of which metadata is stored in the audio metadata storage unit 217 have been processed, the flow advances to step S112.

In step S112, the similarity calculating unit 241 reverts the value of n to the beat count of the reference block.

Thereafter, the flow returns to step S104, and the processing of steps S104 through S111 is repeatedly executed until determination is made in step S111 that the value of s is equal to the total number of tunes.

On the other hand, in the event that determination is made in step S111 that the value of s is equal to the total number of tunes, i.e., in the event that all tunes of which metadata is stored in the audio metadata storage unit 217 have been processed, the flow advances to step S113.

In step S113, the recommended tune extracting unit 243 extracts recommended tunes. Specifically, the recommended tune extracting unit 243 reads out the score of all tunes from the audio metadata storage unit 217, and tabulates the score for each tune. The recommended tune extracting unit 243 then extracts tunes of which the total score is not smaller than a predetermined threshold value as being tunes which can be recommended as suitable of nonstop playback connected to the reference tune. The recommended tune extracting unit 243 supplies the extraction results of recommended tunes to the display control unit 232. Thereafter, the recommended tune searching processing ends.

Thus, tunes suitable for being played connected to a tune being played (reference tune) can be easily searched and found from a great number of tunes, without performing the work of actually listening to the tunes. Also, as described above, similarity is calculated taking into consideration the existence of substitute chords, so tunes having sections harmonically resembling the reference section can be found even if the chord progression does not match that of the reference section. Further, the audio blocks of each track are played with the beat positions matched, so similarity in chord progression between the reference section and searched section can be found by comparing chord progression in increments of beats, without taking into consideration the playing time of the original tune in each section.

Note that while description has been made above regarding an example where chord progressions are compared in increments of beats, this may be performed in increments of eighth notes, sixteenth notes, or even higher precision. In this case, chord progressions can be found at resolution of eighth notes, sixteenth notes, or the like, based on sample positions of each chord in the metadata.

Returning to FIG. 10, in step S8 the display unit 215 updates display of recommended tunes under control of the display control unit 232. Specifically, the display unit 215 displays tune gears 304 corresponding to the recommended tunes extracted in the processing in step S7, with a different form from the other tune gears 304, so as to be distinguishable.

Figure 27:
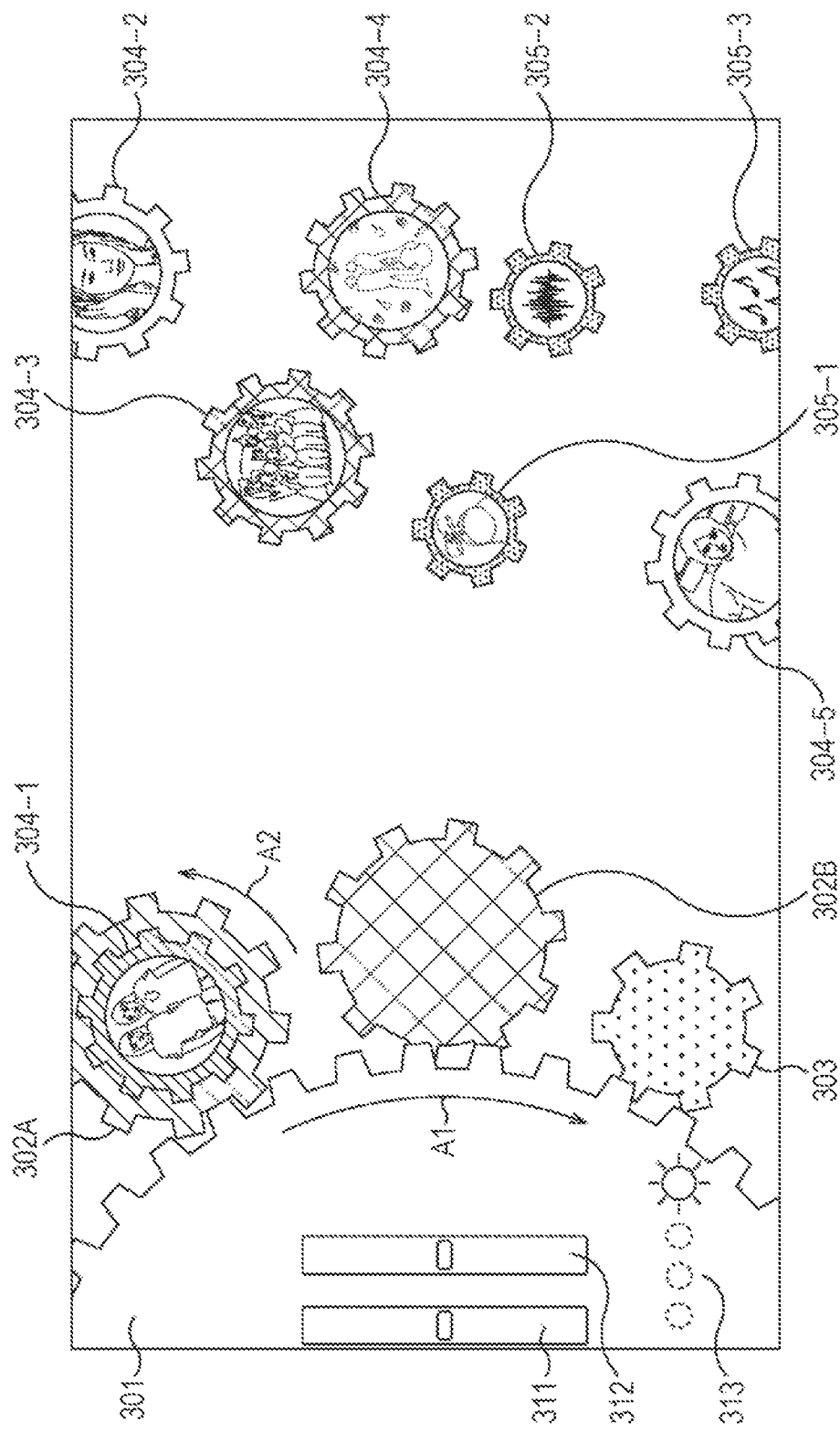
FIG. 27 is a diagram illustrating a display example of recommended tunes.

Now, a display example of recommended tunes will be described with reference to FIGS. 27 and 28. FIG. 27 illustrates an example of a playback tune A corresponding to tune gear 304-1 placed at placeholder 302A being played, and during the playback of the playback tune A, tunes corresponding to tune gear 304-3 and tune gear 304-4 are extracted as recommended tunes as to the playback tune A. In this case, under control of the display control unit 232, the display unit 215 causes the peripheral portion 304B of the tune gear 304-3 and tune gear 304-4 to blink a color similar to that of the placeholder 302B.

Accordingly, the user can easily recognize that the tunes corresponding to the blinking tune gear 304-3 and tune gear 304-4 are tunes suitable for playback connected to the playback tune A. Also, the user can intuitively recognize that one of the blinking tune gear 304-3 and tune gear 304-4 should be placed at the placeholder 302B to execute natural and smooth nonstop mix playback from the playback tune A.

Figure 28:
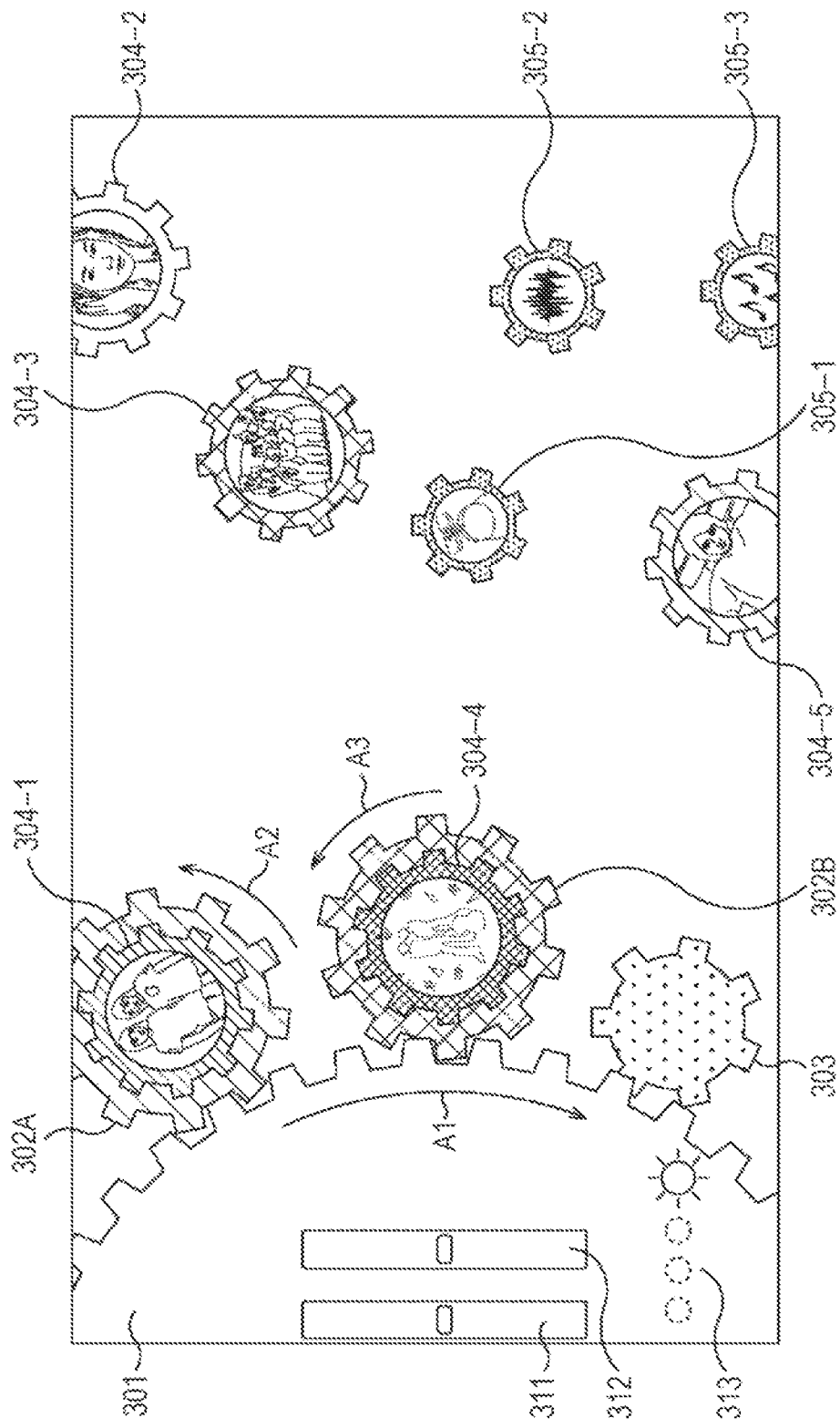
FIG. 28 is a diagram illustrating a display example of recommended tunes.

FIG. 28 illustrates an example of a playback tune A corresponding to tune gear 304-1 placed at placeholder 302A being played, and a playback tune B corresponding to tune gear 304-4 placed at placeholder 302B being played, and during the playback of the playback tune A and playback tune B, a tune corresponding to tune gear 304-3 is extracted as a recommended tune as to the playback tune A, and a tune corresponding to tune gear 304-5 is extracted as a recommended tune as to the playback tune B. In this case, under control of the display control unit 232, the display unit 215 causes the peripheral portion 304B of the tune gear 304-3 to blink a color similar to that of the placeholder 302B, and the peripheral portion 304B of the tune gear 304-5 to blink a color similar to that of the placeholder 302A.

Accordingly, the user can easily recognize that the tune corresponding to the blinking tune gear 304-3 is a tune suitable for playback connected to the playback tune A, and that the tune corresponding to the blinking tune gear 304-5 is a tune suitable for playback connected to the playback tune B. Also, the user can intuitively recognize that the blinking tune gear 304-3 should be placed at the placeholder 302B to execute natural and smooth nonstop mix playback from the playback tune A. Further, the user can intuitively recognize that the blinking tune gear 304-5 should be placed at the placeholder 302A to execute natural and smooth nonstop mix playback from the playback tune B.

Note that in the event that there is a recommended tune extracted for both the playback tune A and playback tune B, the peripheral portion 304B of the tune gear 304 corresponding to that recommended tune alternative blinks a similar color to the placeholder 302A and a similar color to the placeholder 302B. Accordingly, the user can easily recognize that the tune corresponding to the blinking tune gear 304 is a tune suitable for playback connected to both playback tune A and playback tune B. Also, the user can intuitively recognize that the blinking tune gear 304 should be placed at the placeholder 302B or the placeholder 302A to execute natural and smooth nonstop mix from the playback tune A or playback tune B.

Of course, the user may place a tune gear 304 that is not blinking to the placeholder 302A or placeholder 302B to play the corresponding tune. Also, the user may place a blinking tune gear 304 at a placeholder other than that indicated by blinking, to play the corresponding tune. Thereafter, the flow advances to step S9.

On the other hand, in the event that determination is made in step S5 that that which has started playback is not a tune but is a loop material, the processing of steps S6 through S8 is skipped, and the flow advances to step S9. That is to say, when starting playback of loop material, searching of recommended tunes and display updating is not performed.

Also, in the event that determination is made in step S3 that playback of new audio data has not been instructed, the processing of steps S4 through S8 is skipped, and the flow advances to step S9.

In step S9, the playback control unit 261 determines whether or not change of master tempo has been instructed. For example, the user can change the setting position of the tempo slider 312 to change the master tempo by way of the operating unit 214. Also, the user can double tap with a finger or the like or double-click with a mouse on a tune gear 304 placed in the placeholder 302A or placeholder 302B, to instruct the master tempo to be changed to the original tempo of the tune corresponding to the specified tune gear 304.

In the event that a master tempo changing operation such as described above has been performed, the playback control unit 261 determines that change in master tempo has been instructed, and the flow advances to step S10.

In step S10, the music remix system 101 changes the master tempo. For example, in the event that the set position of the tempo slider 312 has been changed, the playback control unit 261 sets a master tempo value corresponding to the changed setting position to the master beat generating unit 281. Also, in the event that change of master tempo to the original tempo of the tune being played has been instructed for example, the playback control unit 261 sets the original tempo of the tune that has been instructed to the master beat generating unit 281 as the value of the master tempo. The master beat generating unit 281 starts generating the master beat at the master tempo set thereto.

In step S11, the music remix system 101 changes the playback speed. Specifically, by processing the same as with step S53 described above, the playback control unit 261 calculates a time stretch value Vt corresponding to each audio data being played, based on the maser tempo after changing. The audio signal generating unit 282 plays each audio data being played at the playback speed of Vt times, based on the time stretch Vt calculated by the playback control unit 261. Accordingly, the tempo of each audio data is changed to the master tempo after change, while maintaining synchronization of the beat of each audio data being played.

Also, under control of the display control unit 232, the display unit 215 changes the rotational speed of the main power gear 301 to a speed corresponding to the master tempo after changing. Further, the display unit 215 changes the rotational speed of the rotating ones of the placeholders 302A through 303 and the tune gears 304 or material gears 305 placed in these placeholders, to a speed corresponding to the master tempo after changing, in accordance with the rotational speed of the main power gear 301.

Note that no speed change is performed for loop material played at its original tempo and loop material being played that does not include a beat. Thereafter, the processing advances to step S12.

On the other hand, in the event that determination is made in step S9 that change of master tempo has not been instructed, the processing of steps S10 and S11 is skipped, and the flow advances to step S12.

In step S12, the playback control unit 261 determines whether or not change in volume balance has been instructed. For example, the user can change the volume balance of playback tune A and playback tune B by changing the setting position of the volume slider 311 by way of the operating unit 214. In the event that the setting position of the volume slider 311 has been changed, the playback control unit 261 determines that change in volume balance has been instructed, and the flow advances to step S13.

In step S13, the music remix system 101 changes the volume balance. Specifically, the playback control unit 261 obtains the volume of playback tune A and playback tune B based on the setting position of the volume slider 311, and sets the obtained volume to the effect processing unit 291. The effect processing unit 291 changes the output volume of the playback tune A and the playback tune B to the volume that has been set. Note that in the event that only one of the playback tune A and playback tune B is being played, only the volume of the tune being played is changed in accordance with the setting position of the volume slider 311. Thereafter, the flow advances to step S14.

On the other hand, in the event that determination is made in step S12 that change of volume balance has not been instructed, the processing of step S13 is skipped, and the flow advances to step S14.

In step S14, the similarity calculating unit 241 determines whether or not it is the timing to update recommended tunes. For example, in the event that playback of the reference block used to search for recommended tunes last time with the tune currently playing has ended, the similarity calculating unit 241 determines that it is the timing to update recommended tunes, and the flow advances to step S15.

In step S15, the similarity calculating unit 241 sets a reference block in the tune currently playing. For example, in the tune that playback of the reference block used to search for recommended tunes last time has ended, the similarity calculating unit 241 sets a predetermined number of bars (e.g., eight bars) starting with the next bar after the reference block to be the reference block. Note that in the event that playback tune A and playback tune B are playing and playback the reference blocks used to search for recommended tunes in both tunes ends, reference blocks are set in each tune.

In step S16, recommended tune searching processing is executed in the same way as with the processing in step S7 described above. Accordingly, in the event that a reference block has been set in either of playback tune A or playback tune B, recommended tunes corresponding to the tune regarding which the reference block has been set are searched for. On the other hand, in the event that reference blocks are set in both playback tune A and playback tune B, recommended tunes are searched for as to both tunes.

In step S17, the display of recommended tunes is updated based on the recommended tune search results, in the same way as with the processing in step S8 described above. Note that while an example has been described above where recommended tunes are searched for after playing of the reference block has ended, based on the next reference block, an arrangement may be made where recommended tunes are searched for before playing of the reference block has ended, based on the next reference block. Alternatively, reference blocks may be set so that the previous reference block and the next reference block overlap. Subsequently, the flow advances to step S18.

On the other hand, in the event that determination is made in step S14 that it is not the timing to update recommended tunes, the processing of steps S15 through S17 is skipped, and the flow advances to step S18.

In step S18, the playback control unit 261 determines whether or not a state where two tunes have been played at the same time has continued for a predetermined period (e.g., n bars (where n is a natural number)). In the event that determination is made that a state where two tunes (playback tune A and playback tune B) are played at the same time has continued for a predetermined period, the flow advances to step S19.

In step S19, the music remix system 101 fades out the tune which had been playing first. Specifically, the playback control unit 261 instructs the effect processing unit 291 to fade out the tune of playback tune A and playback tune B which had been playing first. The effect processing unit 291 fades out the volume of the specified tune. Also, the audio signal generating unit 282 playing the tune which has been faded out stops playback of the tune under control of the playback control unit 261.

Also, under control of the display control unit 232, the display unit 215 relocates the tune gear 304 corresponding to the tune which has been faded out from the placeholder 302A or placeholder 302B to the audio gear yard. Further, under control of the display control unit 232, the display unit 215 stops rotation of the placeholder corresponding to the tune which has been faded out.

Figure 19:
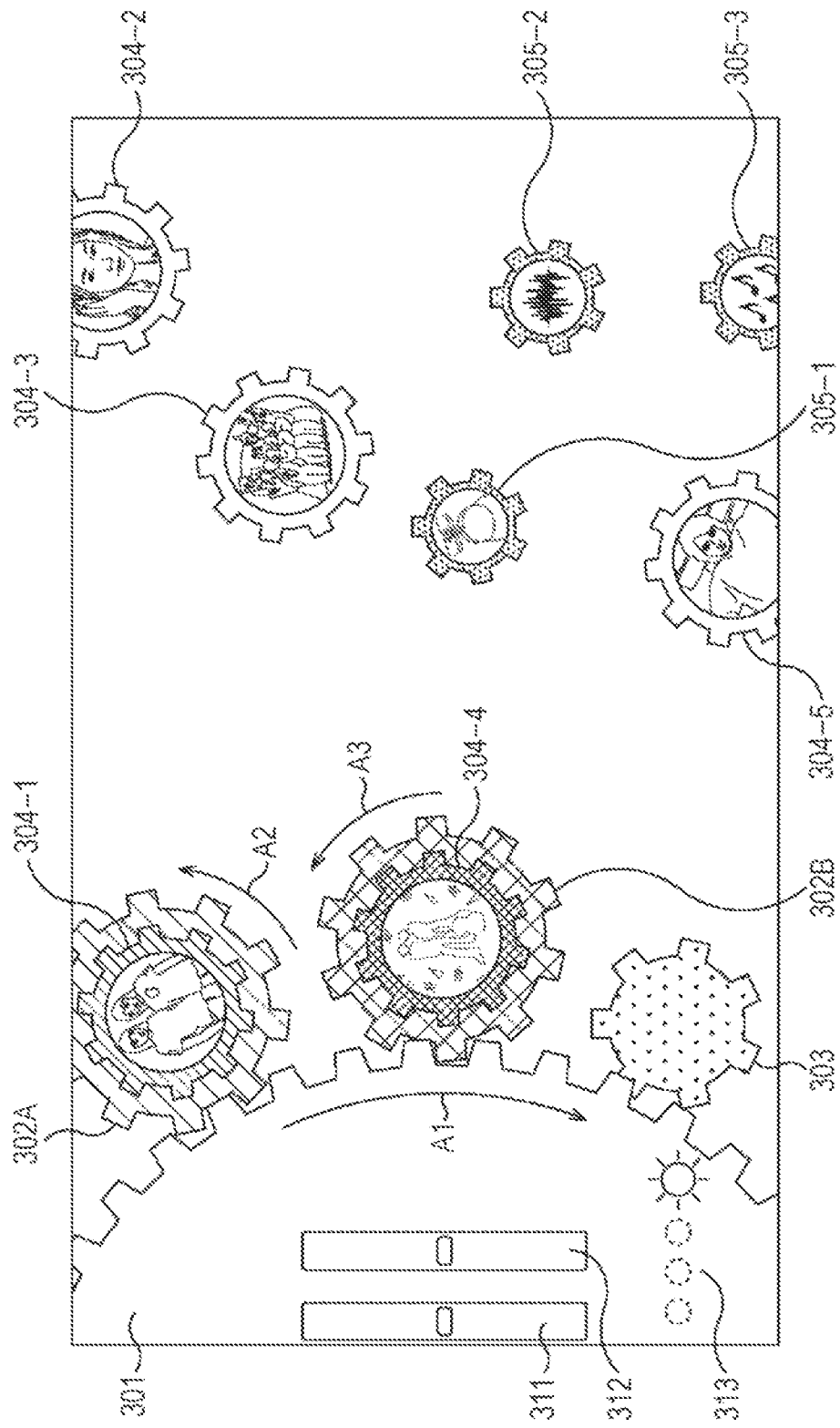
FIG. 19 is a diagram for describing a detailed example of synchronized playback processing.
Figure 29:
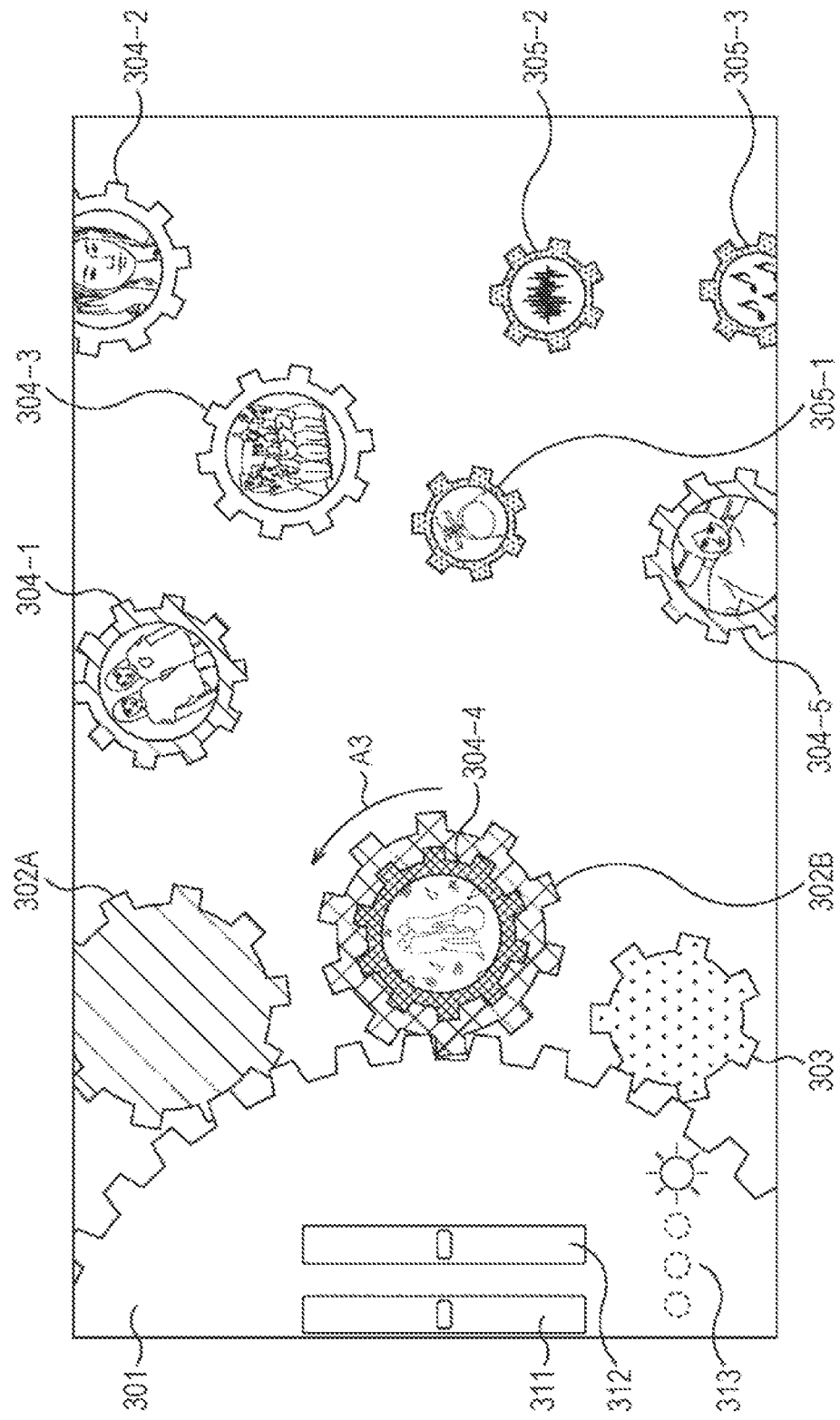
FIG. 29 is a diagram illustrating a display example of a DJ play screen at the time of fadeout.

For example, with the example in FIG. 19 described above, synchronized playback of the playback tune A corresponding to the tune gear 304-1 placed at the placeholder 302A and the playback tune B corresponding to the tune gear 304-4 placed at the placeholder 302B is performed for a predetermined period. Thereafter, the playback tune A fades out, and as illustrated in FIG. 29, the tune gear 304-1 disappears from the placeholder 302A and is relocated to the audio gear yard. Also, the rotation of the placeholder 302A stops. Accordingly, two tunes can be smoothly connected and played nonstop, without user operations. Note that the length of the period of playing the two tunes at the same time may be changeable by user settings or the like. Thereafter, the flow advances to step S20.

On the other hand, in the event that determination is made in step S18 that a state where two tunes have been played at the same time has not continued for the predetermined period, the processing of step S19 is skipped, and the flow advances to step S20.

In step S20, the playback control unit 261 determines whether or not stopping of the audio data being played has been instructed. For example, the user can stop the audio data being played simply by relocating a tune gear 304 from the placeholder 302A or placeholder 302B to the audio gear yard, or relocating a material gear 305 from the placeholder 303 to the audio gear yard, by the operating unit 214. In the event that a stopping operation of audio data being played, such as described above, has been performed, the playback control unit 261 determines that stopping of audio data being played has been instructed, and the flow advances to step S21.

In step S21, the music remix system 101 stops playing of the specified audio data. Specifically, the audio signal generating unit 282 playing the audio data regarding which stopping has been instructed stops playing of the audio data under control of the playback control unit 261. Also, the display unit 215 stops rotation of the placeholder corresponding to the audio data of which playback has been stopped, under control of the display control unit 232. Thereafter, the flow advances to step S22.

On the other hand, in the event that determination is made in step S20 that stopping of the audio data being played has not been instructed, the processing of step S21 is skipped, and the flow advances to step S22.

In step S22, the playback control unit 261 determines whether or not there is a tune which has been played to the end. In the event that determination is made that there is a tune which has been played to the end, the flow advances to step S23. Note that in the event that audio data made up from a part of a tune is being played, and that part of the tune has been played to the end thereof, this is determined as being a tune which has been played to the end.

In step S23, the music remix system 101 stops playing of the relevant tune by processing the same as with the processing in step S21. Thereafter, the processing advances to step S24.

On the other hand, in the event that determination is made in step S22 that there is no tune played to the end, the processing of step S23 is skipped, and the flow advances to step S24.

In step S24, the playback control unit 261 determines whether or not stopping of DJ play has been instructed. In the event that determination is made that stopping of DJ play has not been instructed, the flow returns to step S3.

Thereafter, the processing of steps S3 through S24 is repeatedly executed until determination is made in step S24 that stopping of DJ play has been instructed.

On the other hand, in the event that stopping of DJ play has been instructed in step S24 through the operating unit 214, the playback control unit 261 determines that stopping of DJ play has been instructed, and DJ play processing ends.

Thus, a user can enjoy DJ play with intuitive and simple operations, even without musical knowledge and special skills. That is to say, the user can combine multiple tunes and loop materials and perform DJ play by simple intuitive operations of meshing gears. Also, synchronized playback can be performed with the tempo, beat position, and start of bars of the two tunes being matched, simply by placing tune gears 304 at the placeholder 302A and placeholder 302B. Further, switching from a tune which had been playing first to a next tune can be smoothly performed nonstop. Also, by selecting recommended tunes presented by the music remix system 101, multiple tunes can be easily played by nonstop mix playback in natural combinations.

Moreover, the DJ play screen is constantly moving, and the movement thereof is clear and brisk, so a crowd experiencing a performance using the DJ play screen can enjoy the DJ play not only for the sound thereof but also visually.

2. Modifications

Modifications of the above-described present technology will be described next.

Modification 1

Modification Relating to DJ Play Screen

The number of placeholders is not restricted to the above-described example. For example, the number of placeholders may be increased, increasing the number of tunes and loop materials which can be combined and played at the same time.

Also, an arrangement may be made where, instead of using placeholders, tune gears 304 and material gears 305 can be meshed at desired positions on the main power gear 301. Further, an arrangement may be made where the main power gear 301 is not used, and multiple tune gears 304 are directly meshed to perform synchronized playback of multiple tunes, or tune gears 304 and material gears 305 are directly meshed to perform synchronized playback of tunes and loop material.

Also, a tune may be optionally assigned to the main power gear 301. The tune or loop material corresponding to the tune gear 304 or material gear 305 meshed with the main power gear 301 may be synchronously played with the tune assigned to the main power gear 301. In this case, the master tempo may be set by default to the original tempo of the tune assigned to the main power gear 301. Also, the tune assigned to the main power gear 301 may be changed at an optional timing.

Further, the display form (color, design, size, etc.) of the tune gears 304 may be made to differ depending on the genre of the corresponding tune, the mood, and so forth. Also, the tune gears 304 displayed in the audio gear yard may be searchable by genre or mode or the like. This enables desired tunes to be searched for more easily.

Also, in a case of displaying a tune gear 304 corresponding to a recommended tune, the display form may be changed depending on how high the score is, so that a tune gear 304 corresponding to a tune with a higher score is more conspicuous. Conceivable examples include the tune gear 304 being made larger, brighter, more conspicuous in color or design, etc., the higher the score is of the corresponding tune.

Figure 30:
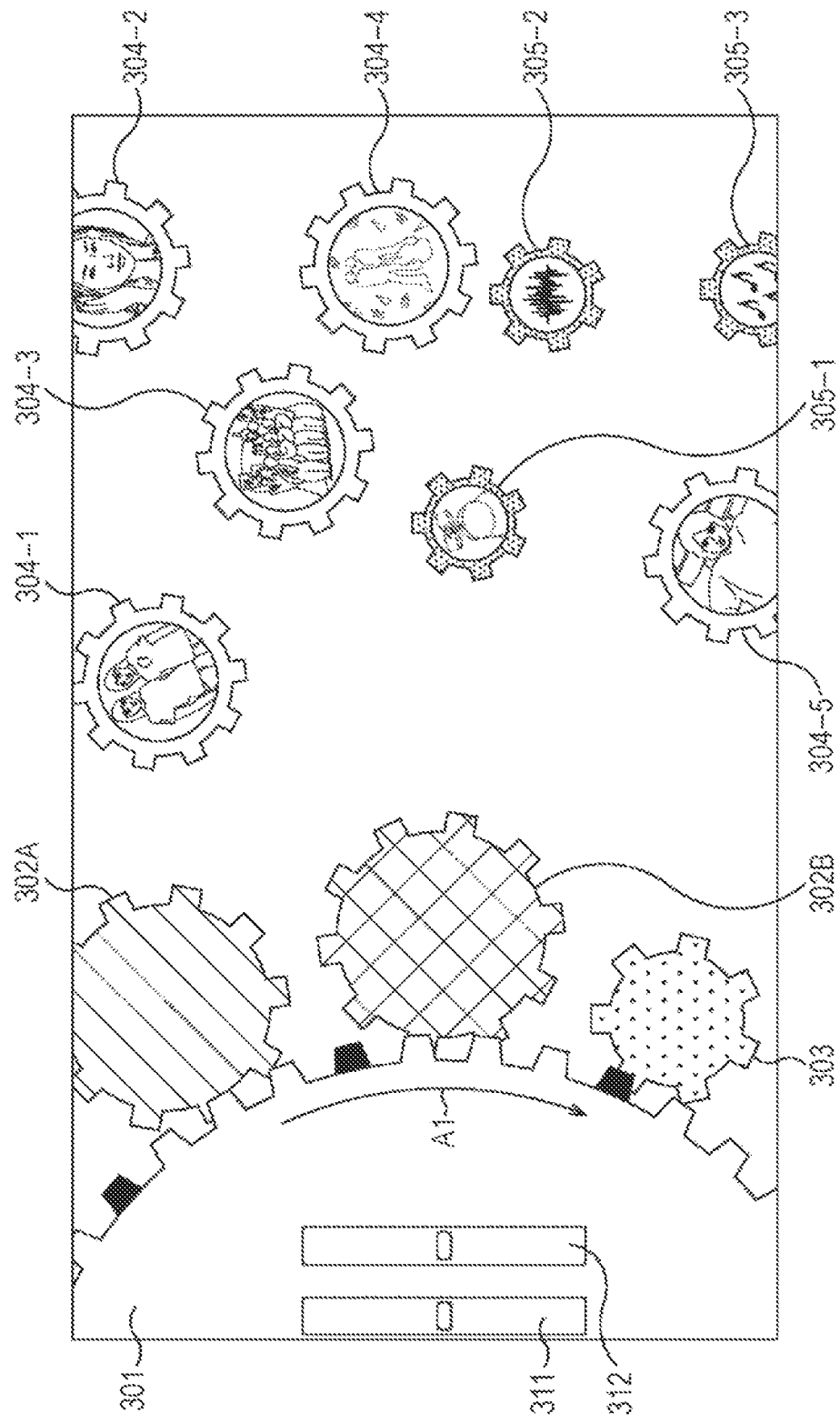
FIG. 30 is a diagram illustrating a display example of the start of a bar in a remix line.

Further, as illustrated in FIG. 30, a cog of the main power gear 301 corresponding to the start of a bar in a remix line may be changed in form (e.g., different color or design) of display from other cogs of the main power gear 301. Accordingly, the start position of the bar in the remix line can be comprehended even without the bar/beat indicator 313. Note that with the example in FIG. 30, the measure of the remix line is quarter time, with the color of every fourth cog of the main power gear 301 being different from the color of the other cogs.

Also, the above description has been made with the main power gear 301, tune gears 304, and material gears 305 being formed as spur gears, but an arrangement may be made where gears of types other than spur gears are used. Examples of gears on parallel axes as with the spur gears include helical gears, annular gear and external gear, rack-and-pinion (linear gear and pinion combination), and so forth.

Figure 31:
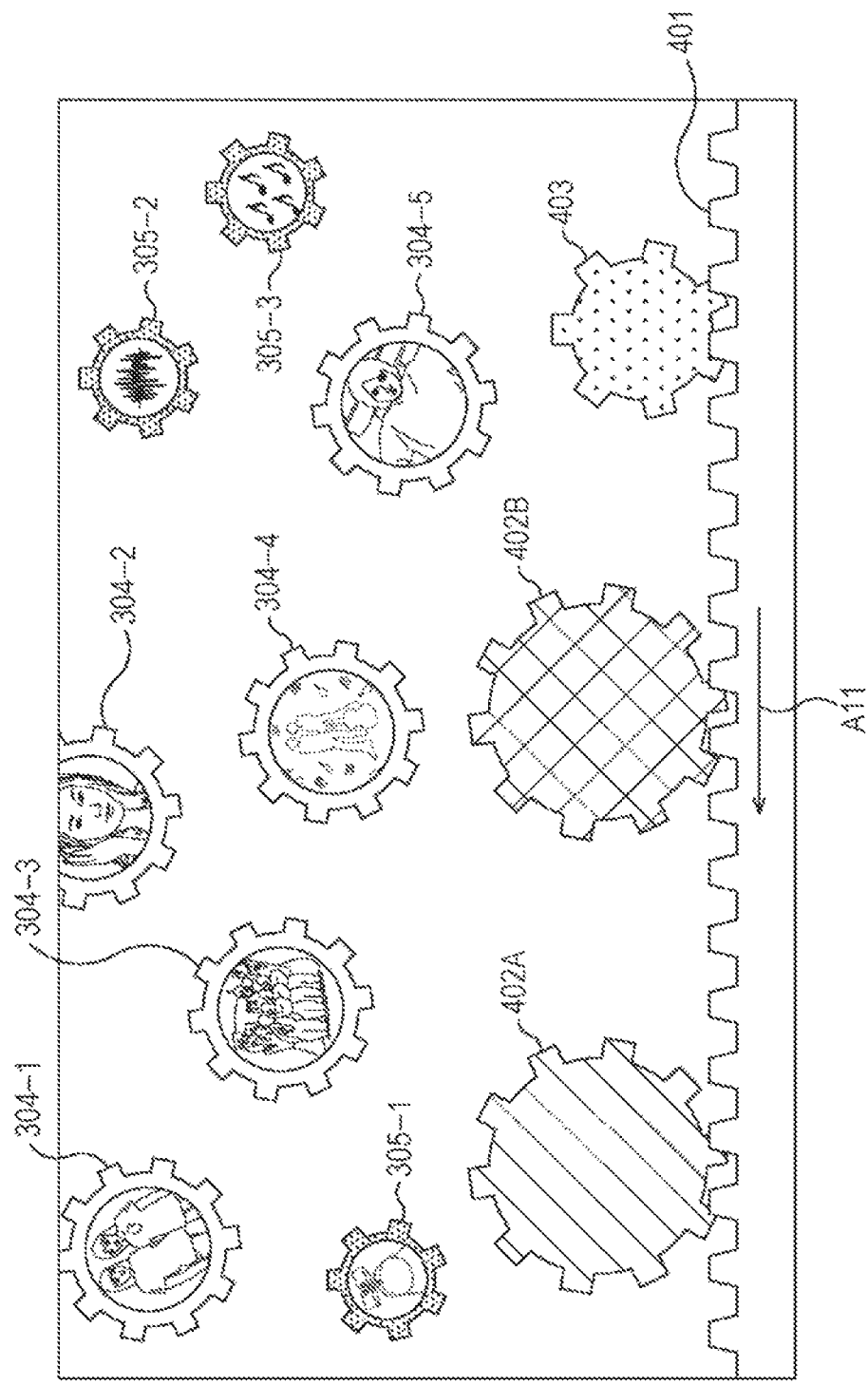
FIG. 31 is a diagram illustrating a modification of a DJ play screen.

FIG. 31 illustrates and example of the DJ play screen in a case where a main power gear 401 is configured as a rack (linear gear). Note that portions in the diagram corresponding to the portions in FIG. 12 are denoted with the same reference numerals.

The DJ play screen in FIG. 31 differs from the play screen in FIG. 12 in that the main power gear 401 is provided instead of the main power gear 301, and that placeholders 402A through 403 are provided instead of the placeholders 302A through 303. The main power gear 401 is configured as a rack (linear gear), with the cogs moving from the right toward the left, as indicated by arrow A11, for example. Also, the speed of the main power gear 401 moving changes in accordance with the setting value of the master tempo.

The placeholders 402A through 403 are situated near the cogs of the main power gear 401 at predetermined intervals. The placeholders 402A, 402B, and 403 each are colored the same as with the placeholders 302A, 302B, and 303 in FIG. 12. Multiple tune gears 304 and multiple material gears 305 are randomly situated in an audio gear yard above the DJ play screen. By placing any tune gear 304 at the placeholder 402A or 402B, the tune or part of the tune corresponding to that tune gear 304 is played. Also, by placing any material gear 305 at the placeholder 403, the loop material corresponding to that material gear 305 is played. Note that illustration of operating members corresponding to the volume slider 311, tempo slider 312, and bar/beat indicator 313 in FIG. 12 has been omitted from FIG. 31.

Note that in addition to gears with parallel axes, various types of special gears may be used, such as gears with intersecting axes such as bevel gears, skew gears such as worm gears and cylindrical worm gears, and face gears and so forth, for example.

Further, the user interface using the above gears may be applied to a case of playing single audio data alone, as well. For example, with a device which plays audio data one at a time, an interface can be provided where a desired gear is meshed with the power gear and audio data corresponding to the gear is played, and the tempo may be changed according to the rotational speed of the power gear, and so forth.

Modification 2

Modification Relating to Playing of Audio Data

An example has been described above where only the volume balance of the playback tune A and the playback tune B can be adjusted, but an arrangement may be made where the volume balance between tunes and loop materials can be adjusted as well.

Further, while an example has been described above where, in the event that one tune is being played and playing of another tune is then started, playing of the tune which had been played first is automatically faded out, but a mode may be provided where this is executed manually. For example, when an operation is performed to remove a tune gear 304 from the placeholder 302A or placeholder 302B, the tune corresponding to this tune gear 304 may be faded out. Accordingly, the tune being played can be faded out at a desired timing. Note that in this case, the display of the tune gear 304 may be faded out correspondingly.

Modification 3

Modification Relating to Collaborative DJ Play

Figure 32:
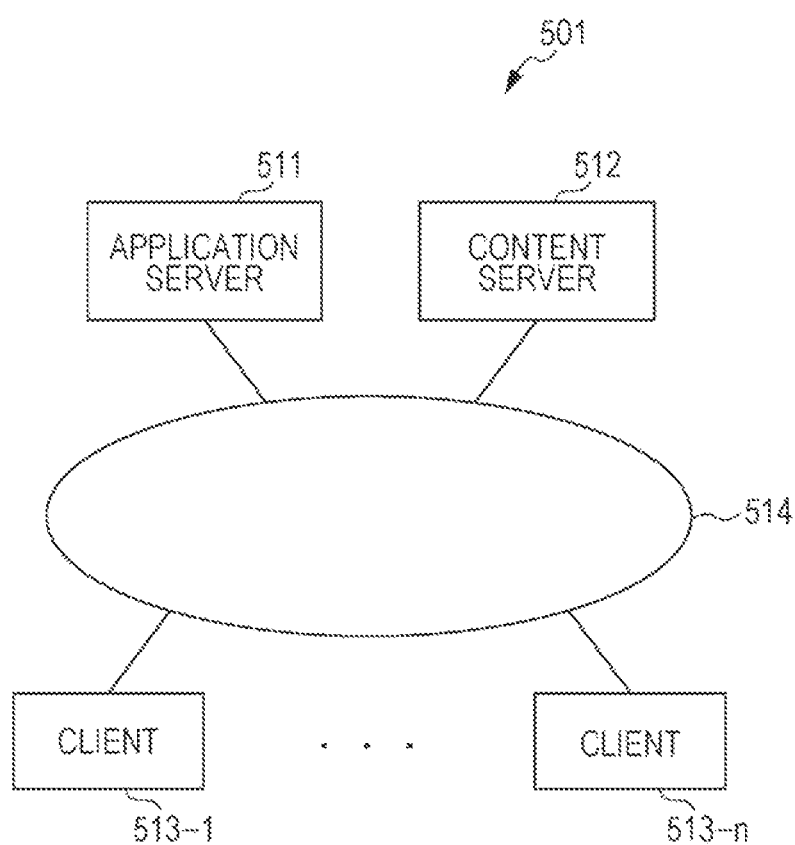
FIG. 32 is a block diagram illustrating a configuration example of a network system.

While an example has been described above of executing DJ play by a single music remix system 101, multiple users may collaboratively perform DJ play using multiple clients connected via a network such as the Internet. FIG. 32 illustrates a configuration example of a network system 501 which enables multiple users to perform JD play collaboratively.

The network system 501 is configured including an application server 511, a content server 512, and clients 513-1 through 513-n. The application server 511, content server 512, and clients 513-1 through 513-n, are connected with each other via a network 514 configured of the Internet or the like.

The application server 511 provides the clients 513-1 through 513-n with application programs to execute the DJ play described above, via the network 514. Also, the application server 511 receives operation information at the clients 513-1 through 513-n through the network 514, and performs processing corresponding to the operation information. Further, the application server 511 instructs the content server 512 to transmit audio data to the clients 513-1 through 513-n via the network 514. Also, the application server 511 transmits various types of instructions to the clients 513-1 through 513-n via the network 514.

The content server 512 holds audio data of various types of tunes and loop materials, and provides these to the clients 513-1 through 513-n through the network 514.

The clients 513-1 through 513-n are configured of devices capable of executing the DJ play by executing the application programs provided from the application server 511, such as personal computers, personal digital assistants, cellular phones, smartphones, and so forth. Note that unless the clients 513-1 through 513-n have to be individually identified, these will be referred to simply as "client 513" hereinafter.

Figure 33:
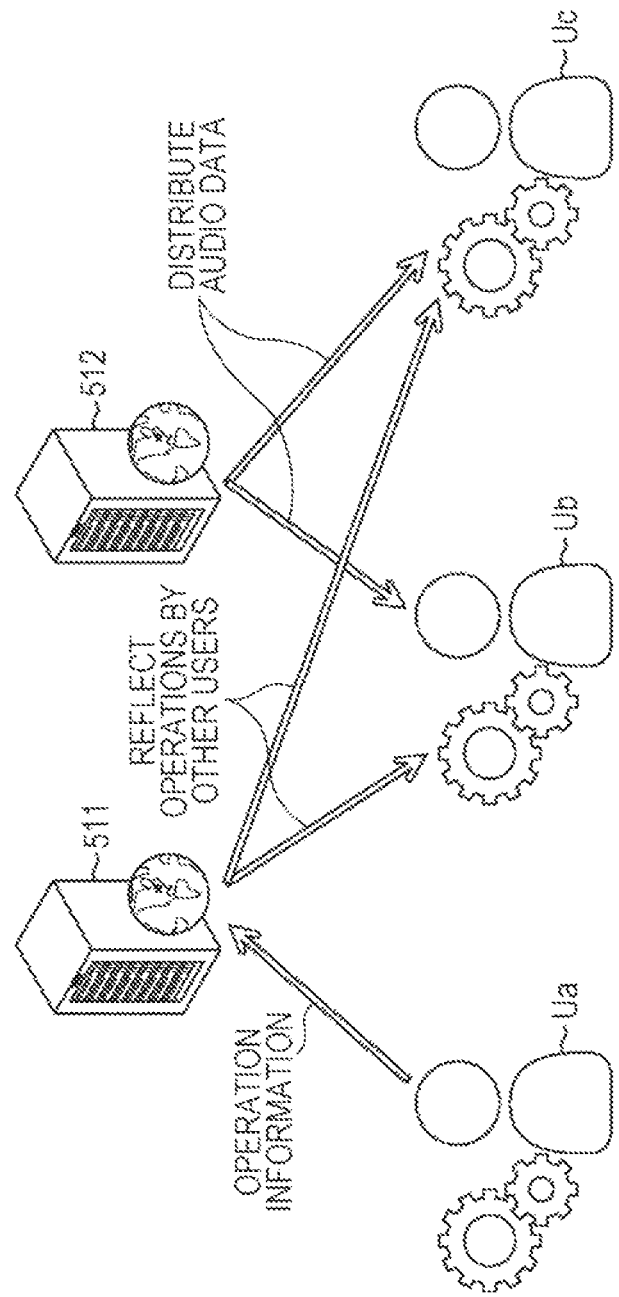
FIG. 33 is a diagram for describing collaborative work with DJ play.

As illustrated in FIG. 33, with the network system 501, multiple users can execute DJ play collaboratively, using multiple clients 513. For example, in the event that a user Ua has performed an operation on the DJ play screen, the operation information thereof is transmitted from the client 513 of the user Ua to the application server 511 via the network 514. The application server 511 provides a DJ play screen reflecting the operation by the user Ua to clients 513 of a user Ub and user Uc via the network 514. Also, in a case of starting playing of a new tune or loop material by an operation of the user Ua, the content server 512 provides audio data corresponding to that tune or loop material to the clients 513 of the user Ub and user Uc via the network 514. Similar processing is performed in the event that the user Ub or user Uc has performed operations on the DJ play screen, as well.

Accordingly, DJ play screens of the same contents are displayed on the clients 513 of the users Ua through Uc, and a single main power gear 301 is shared. Also, DJ play can be performed collaboratively by the users Ua through Uc meshing tune gears 304 and material gears 305 with the main power gear 301, at their respective clients 513. For example, nonstop mix playback of a tune selected by user Ub can be performed following a tune which the user Ua as selected.

Note that in the event of multiple users performing DJ play collaboratively, the users may share audio data (tunes and loop materials) which each one owns. That is to say, one user may perform DJ play using audio data which another collaborating user has. Also note that audio data which a user has is not restricted to audio data which is physically held at the client 513 of this user, but also may include downloadable audio data at the content server 512 which this user has the right to use.

In this case, the client 513 of the user Ub, for example, displays in the audio gear yard not only audio data which the user Ub owns, but also tune gears 304 and material gears 305 corresponding to audio data which the user Ua and user Uc own. In the event that audio data which the user Ua has but the user Ub does not have is to be played, this audio data is transmitted from the content server 512 to the client 513 of the user Ub and played. Note that the display forms of the tune gears 304 and material gears 305 may be changed so that the users can differentiate between audio data that is their own and audio data owned by other users.

Figure 34:
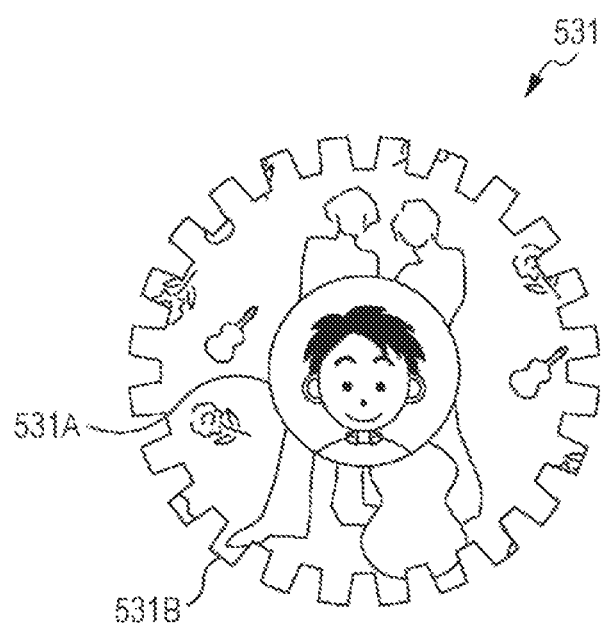
FIG. 34 is a diagram illustrating a modification of a tune gear.

Alternatively, as illustrated in FIG. 34 for example, an icon or photograph or the like representing the user holding the corresponding tune may be displayed at a circular information display portion 531A at the middle of a tune gear 531. This icon or photograph or the like may be that which the user uses with a social networking server (SNS) or the like. Also, a peripheral portion 531B surrounding the information display portion 531A displays cover artwork of an album or single containing the corresponding tune, a photograph or the like of the artist, or the like. Thus, the users holding the tunes corresponding to the tune gears 531 can be readily identified.

Note that the display positions of the icon or the like representing the user, the cover artwork of the tune or the like, and so forth, are not restricted to the example illustrated in FIG. 34, and the tune gear 531 may be divided into top and bottom so as to display these, for example. Also, the display forms of the tune gears described above may be also applied to material gears corresponding to loop materials, as well.

Configuration Example of Computer

The series of the processing described above can be performed by hardware or by software. In the case where processing by software is performed, a program making up the software is installed a computer. The computer may be a computer built into dedicated hardware, a general-purpose computer where various programs are installed whereby various types of processing can be performed, and so forth.

Figure 35:
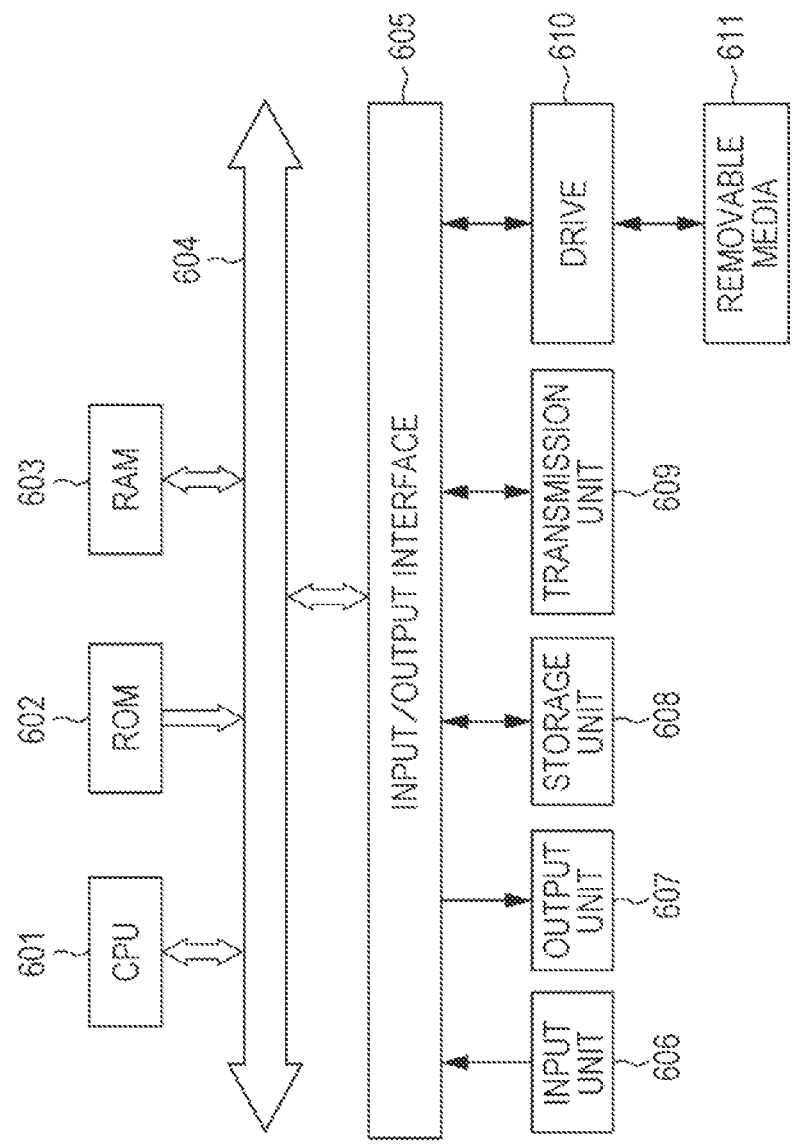
FIG. 35 is a block diagram illustrating an example configuration of a computer.

FIG. 35 is a block diagram illustrating a configuration example of hardware of a computer which executes the above-described series of processing by a program. The computer has a central processing unit (CPU) 601, read only memory (ROM) 602, and random access memory (RAM) 603, mutually connected by a bus 604.

The bus further has connected thereto an input/output interface 605. The input/output interface 605 has connected thereto an input unit 606, output unit 607, storage unit 608, communication unit 609, and drive 610.

The input unit 606 is configured of a keyboard, mouse, microphone, and so forth. The output unit 607 is configured of a display, speaker, and so forth. The storage unit 608 is configured of non-volatile memory such as a hard disk, and so forth. The communication unit 609 is configured of a network interface and so forth. The drive 610 drives removable media 611 such as a magnetic disk, optical disc, magneto-optical disk, semiconductor memory, or the like.

With a computer configured thus, the CPU 601 loads a program stored in the storage unit 608, for example, to the RAM 603 via the input/output interface 605 and bus 604, and executes the program, whereby the above-described series of processing is performed.

The program which the computer (CPU 601) executes may be recorded in removable media 611 and provided as packaged media or the like, for example. Also, the program may be provided via a cable or wireless transmission medium, such as a local area network, the Internet, digital satellite broadcasting, or the like.

The program may be installed to the computer by mounting the removable media 611 to the drive 610, and installing the program to the storage unit 608 via the input/output interface 605. Alternatively, the program may be received by the communication unit 609 via cable or wireless transmission media, and installed in the storage unit 608. Furthermore, the program may be installed in the ROM 602 or the storage unit 608 beforehand.

Note that the program which the computer executes may be a program where processing is performed following the time-sequence described in the present Specification, or may be a program where processing is performed in parallel, or at an appropriate timing, such as at the time of callup.

Also, in the present Specification, the term "system" refers to a collection of multiple components (devices, modules (parts), etc.), and whether all components are within the same housing is irrelevant. Accordingly, both multiple devices stored in separate housings and connected via network, and a single device with multiple modules stored within a single housing, are systems.

Further, embodiments of the present technology are not restricted to the above-described embodiments, and various modifications may be made without departing from the technical spirit of the present technology. For example, the present technology may assume a form of cloud computing, where multiple devices share and collaboratively process a single function over a network. Each step described in the flowcharts above may be executed by a single device, or may be shared among multiple devices. Further, in the event that multiple processes are included in a single step, the multiple processes included in that single step may be executed by a single device, or may be shared among multiple devices.

The present technology may also assume the following configurations.

(1) An audio processing device including:

a display control unit, configured to control display of a plurality of audio gears, which are gears movable within a screen, each audio gear corresponding to predetermined audio data; and a playback control unit configured to control synchronized playback of a plurality of audio data;

wherein, in the event that a plurality of the audio gears are directly or indirectly meshed, the display control unit rotates the plurality of audio gears, and the playback control unit performs synchronized playback of the plurality of audio data corresponding to the plurality of audio gears.

(2) The audio processing device according to (1), wherein the display control unit further controls display of a power gear which is a gear corresponding to no audio data;

and wherein, in the event that a plurality of the audio gears are meshed with the power gear, the display control unit rotates the plurality of the audio gears along with the power gear, and the playback control unit performs synchronized playback of the plurality of audio data corresponding to the plurality of audio gears indirectly meshed via the power gear.
(3) The audio processing device according to (2),
wherein a tempo at which audio data is played is variable;
and wherein the display control unit changes the rotational speed of the power gear and the rotational speed of the audio gears meshed with the power gear, in accordance with a set tempo.
(4) The audio processing device according to (3),
wherein each cog of the power gear and the audio gears represents one beat;
and wherein during the progression of one beat of audio data, the display control unit rotates the power gear and the audio gears meshed with the power gear by one pitch worth.
(5) The audio processing device according to any one of (2) through (4),
wherein the display control unit further controls display of a predetermined plurality of placement positions to mesh the audio gears to the power gear;
and wherein the playback control unit plays audio data corresponding to the audio gears placed at the placement positions.
(6) The audio processing device according to (5), further including:
an audio data searching unit configured to search for second audio data suitable for playing connected to first audio data which is currently playing;
wherein the display control unit displays the multiple placement positions each with different forms, and also displays the audio gear corresponding to the second audio data with a form corresponding to a display form of the placement position for playing connected to the first audio data.
(7) The audio processing device according to any one of (2) through (6),
wherein, in the event that a second audio gear corresponding to the second audio data is meshed with the power gear in a situation where the first audio data is being played by a first audio gear having been meshed with the power gear, the playback control unit fades out the first audio data;
and wherein the display control unit relocates the first audio gear from a position meshed with the power gear in conjunction with the fadeout of the first audio data.
(8) The audio processing device according to (1),
wherein a tempo at which audio data is played is variable;
and wherein the display control unit changes the rotational speed of the audio gears in accordance with a set tempo.
(9) The audio processing device according to (8),
wherein each cog of the audio gears represents one beat;
and wherein during the progression of one beat of audio data, the display control unit rotates the audio gears by one pitch worth.
(10) The audio processing device according to any one of (1) through (5) and (7) through (9), further including:
an audio data searching unit configured to search for audio data suitable for playing connected to audio data which is currently playing;
wherein the display control unit displays the audio gear corresponding to the searched audio data with a form different from that of the other audio gears.
(11) The audio processing device according to any one of (1) through (10),
wherein the playback control unit plays with the start of bars of the plurality of audio data matched.
(12) The audio processing device according to any one of (1) through (11),
wherein the display control unit displays audio gears corresponding to tunes or parts of tunes, and audio gears corresponding to loop material, with different forms.
(13) The audio processing device according to any one of (1) through (12), further including:
an operating unit configured to operate the audio gears.
(14) An audio processing method including:
controlling display of a plurality of audio gears, which are gears movable within a screen, each audio gear corresponding to predetermined audio data; and
in the event that a plurality of the audio gears are directly or indirectly meshed, controlling display so as to rotate the plurality of audio gears, and performing synchronized playback of the plurality of audio data corresponding to the plurality of audio gears.
(15) A program, causing a computer to perform processing including:
controlling display of a plurality of audio gears, which are gears movable within a screen, each audio gear corresponding to predetermined audio data; and
in the event that a plurality of the audio gears are directly or indirectly meshed, controlling display so as to rotate the plurality of audio gears, and performing synchronized playback of the plurality of audio data corresponding to the plurality of audio gears.

The present disclosure contains subject matter related to that disclosed in Japanese Priority Patent Application JP 2012-195766 filed in the Japan Patent Office on Sep. 6, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An audio processing device comprising:
a display control unit, configured to control display of a plurality of audio gears, which are gears movable within a screen, each audio gear corresponding to predetermined audio data; and
a playback control unit configured to control synchronized playback of a plurality of audio data;
wherein, in the event that a plurality of the audio gears are meshed, the display control unit rotates the plurality of audio gears, and the playback control unit performs synchronized playback of the plurality of audio data corresponding to the plurality of audio gears,
wherein the display control unit and the playback control unit are each implemented via at least one processor.
2. The audio processing device according to claim 1,
wherein the display control unit further controls display of a power gear which is a gear corresponding to no audio data;
and wherein, in the event that a plurality of the audio gears are meshed with the power gear, the display control unit rotates the plurality of the audio gears along with the power gear, and the playback control unit performs synchronized playback of the plurality of audio data corresponding to the plurality of audio gears meshed with the power gear.

3. The audio processing device according to claim 2,
wherein a tempo at which audio data is played is variable;
and wherein the display control unit changes the rotational speed of the power gear and the rotational speed of the audio gears meshed with the power gear, in accordance with a set tempo.

4. The audio processing device according to claim 3,
wherein each cog of the power gear and the audio gears represents one beat;
and wherein during the progression of one beat of audio data, the display control unit rotates the power gear and the audio gears meshed with the power gear by one pitch worth, wherein the one pitch corresponds to a space between adjacent cogs.

5. The audio processing device according to claim 2,
wherein the display control unit further controls display of a predetermined plurality of placement positions to mesh the audio gears to the power gear;
and wherein the playback control unit plays audio data corresponding to the audio gears placed at the placement positions.

6. The audio processing device according to claim 5, further comprising:
an audio data searching unit configured to search for second audio data suitable for playing connected to first audio data which is currently playing;
wherein the display control unit displays the multiple placement positions each with different forms, and also displays the audio gear corresponding to the second audio data with a form corresponding to a display form of the placement position for playing connected to the first audio data, and
wherein the audio data searching unit is implemented via at least one processor.

7. The audio processing device according to claim 2,
wherein, in the event that a second audio gear corresponding to a second audio data is meshed with the power gear in a situation where the first audio data is being played by a first audio gear having been meshed with the power gear, the playback control unit fades out the first audio data;
and wherein the display control unit relocates the first audio gear from a position meshed with the power gear in conjunction with the fadeout of the first audio data.

8. The audio processing device according to claim 1,
wherein a tempo at which audio data is played is variable;
and wherein the display control unit changes the rotational speed of the audio gears in accordance with a set tempo.

9. The audio processing device according to claim 8,
wherein each cog of the audio gears represents one beat;
and wherein during the progression of one beat of audio data, the display control unit rotates the audio gears by one pitch worth, wherein the one pitch corresponds to a space between adjacent cogs.

10. The audio processing device according to claim 1, further comprising:
an audio data searching unit configured to search for audio data suitable for playing connected to audio data which is currently playing;
wherein the display control unit displays the audio gear corresponding to the searched audio data with a form different from that of the other audio gears, and
wherein the audio data searching unit is implemented via at least one processor.

11. The audio processing device according to claim 1,
wherein the playback control unit plays with the start of bars of the plurality of audio data matched.

12. The audio processing device according to claim 1,
wherein the display control unit displays audio gears corresponding to tunes or parts of tunes, and audio gears corresponding to loop material, with different forms.

13. The audio processing device according to claim 1, further comprising:
an operating unit configured to operate the audio gears,
wherein the operating unit is implemented via at least one processor.

14. An audio processing method comprising:
controlling display of a plurality of audio gears, which are gears movable within a screen, each audio gear corresponding to predetermined audio data; and
in the event that a plurality of the audio gears are meshed, controlling display so as to rotate the plurality of audio gears, and performing synchronized playback of the plurality of audio data corresponding to the plurality of audio gears.

15. A non-transitory computer-readable medium having embodied thereon a program, which when executed by a computer causes the computer to execute a method, the method comprising:
controlling display of a plurality of audio gears, which are gears movable within a screen, each audio gear corresponding to predetermined audio data; and
in the event that a plurality of the audio gears are meshed, controlling display so as to rotate the plurality of audio gears, and performing synchronized playback of the plurality of audio data corresponding to the plurality of audio gears.

* * * * *